July 17, 1951
J. C. MOUZON
2,560,734
MEASURING AND CONTROLLING APPARATUS
Filed April 11, 1946
6 Sheets-Sheet 1
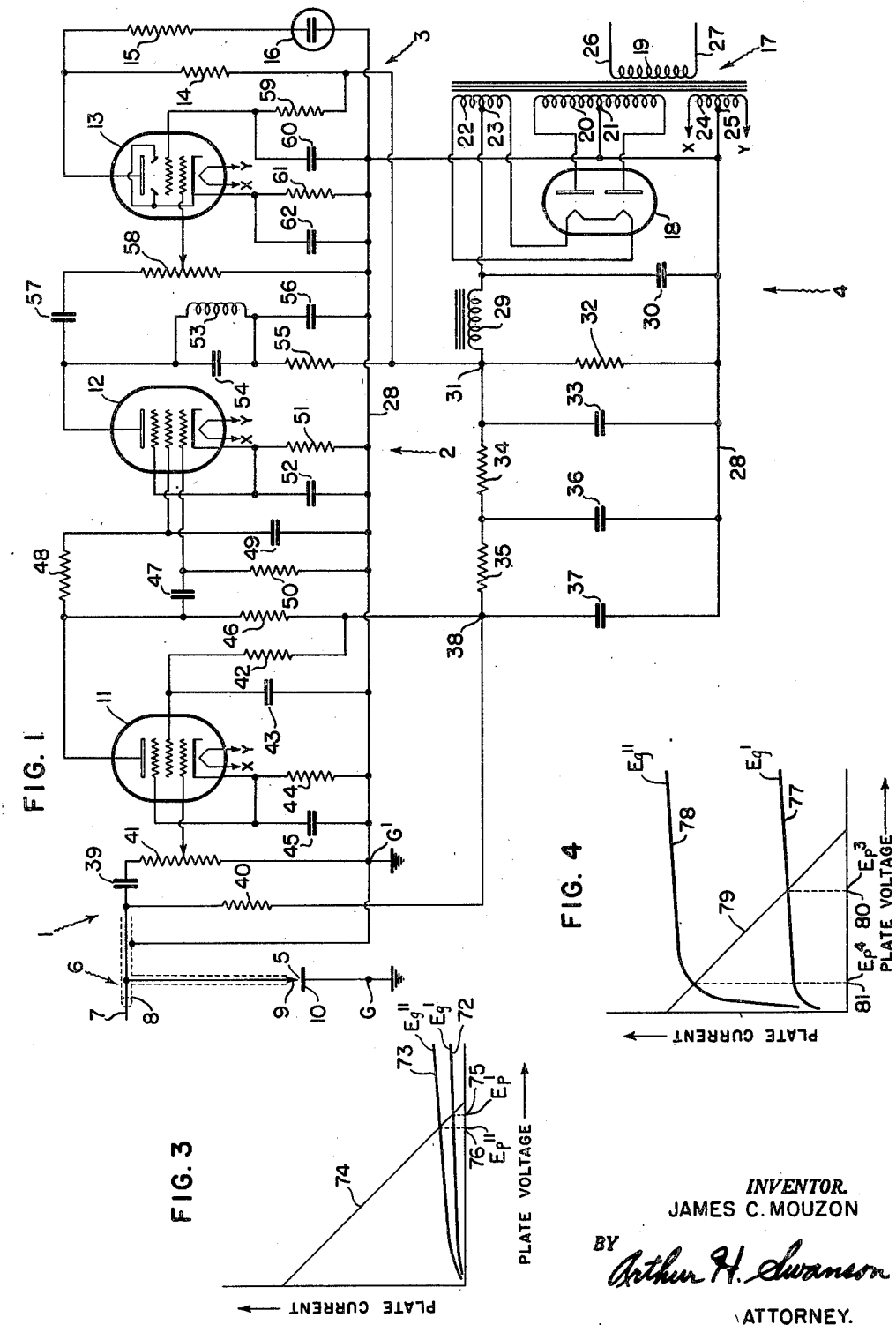
FIG. 1
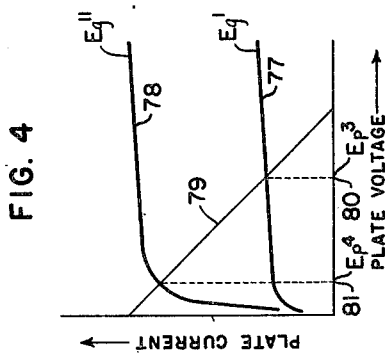
FIG. 3
FIG. 4
INVENTOR.
JAMES C. MOUZON
BY Arthur H. Swanson
ATTORNEY.

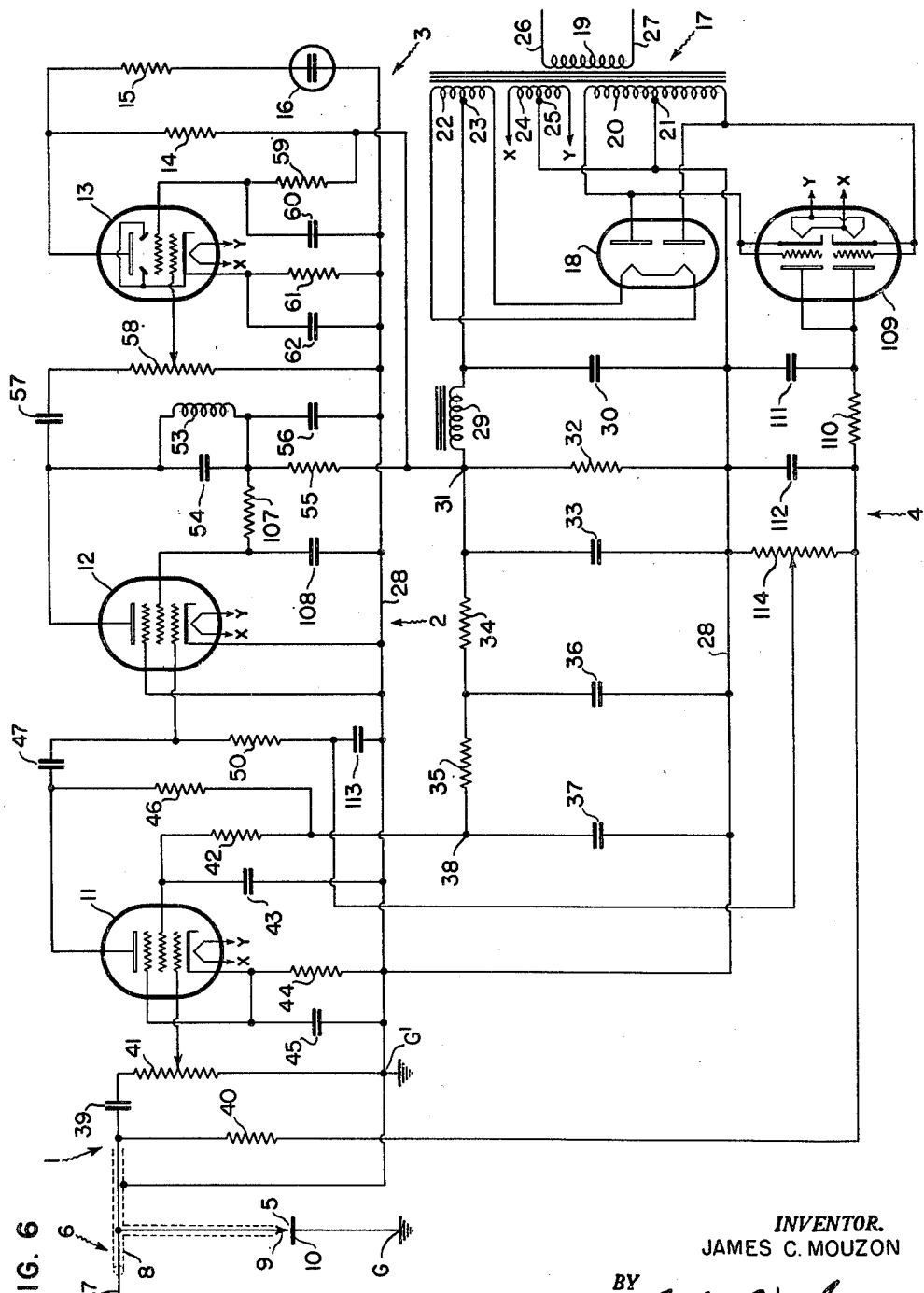

INVENTOR.
JAMES C. MOUZON
BY Arthur H. Swanson
ATTORNEY.

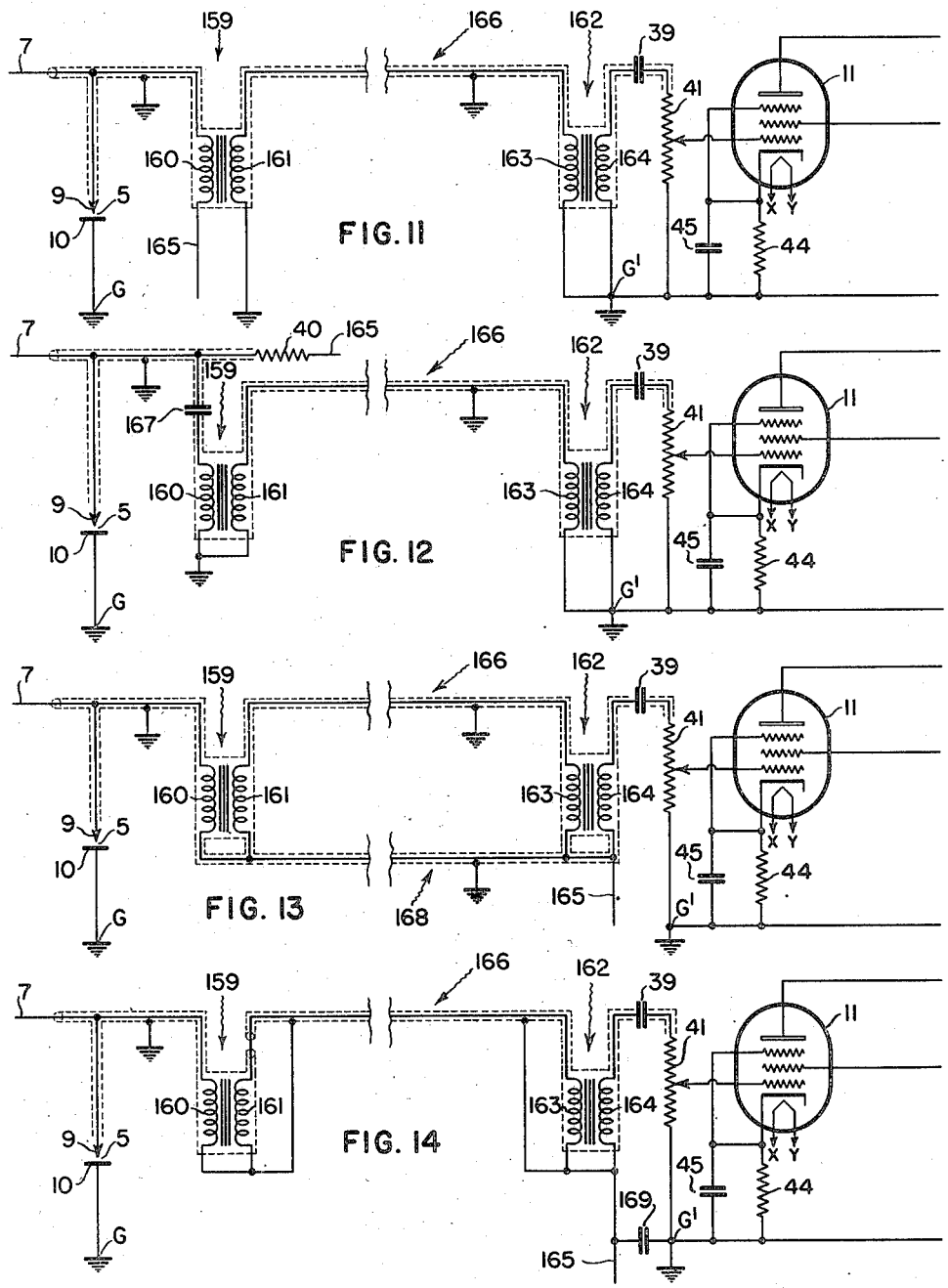

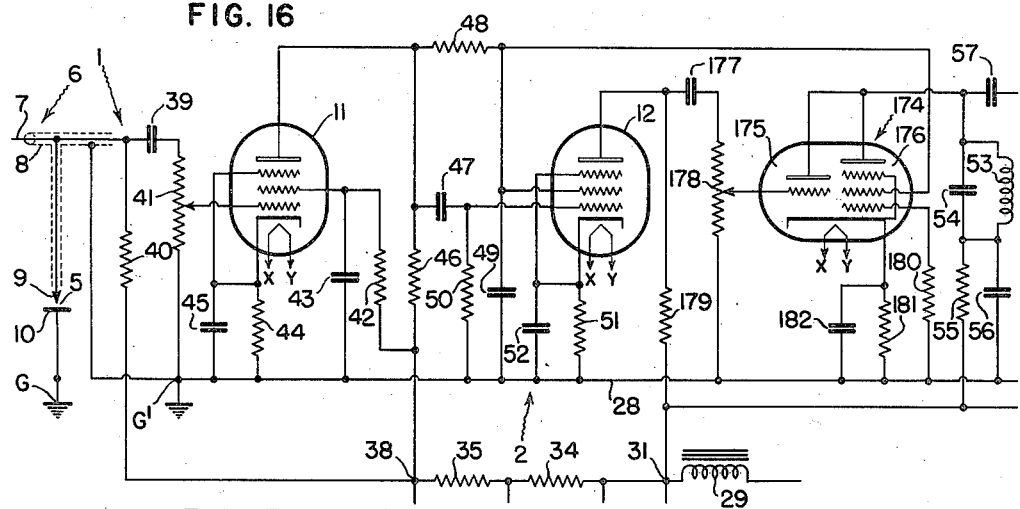

Patented July 17, 1951

2,560,734

UNITED STATES PATENT OFFICE 2,560,734

MEASURING AND CONTROLLING
APPARATUS

James C. Mouzon, Philadelphia, Pa., assignor, by mesne assignments, to Minneapolis-Honeywell Regulator Company, Minneapolis, Minn., a corporation of Delaware Application April 11, 1946, Serial No. 661,202

30 Claims. (Cl. 175—183)

The present invention relates to an apparatus for detecting fluctuations in ionization in a chamber containing ionized particles, and has special utility in detecting and indicating the fluctuation in ionization accompanying detonation in an internal combustion engine thereby to provide an indication of detonation and also the degree and frequency of its occurrence.

An object of the present invention is to provide an improved apparatus for detecting and indicating the occurrence of fluctuations in ionization occurring in a chamber containing ionized particles.

Another object of the present invention is to provide an improved apparatus for detecting and indicating the occurrence of fluctuations in ionization accompanying detonation in an internal combustion engine, thereby to provide an indication of the occurrence of detonation, and also its degree and frequency of occurrence.

Another object of this invention is to provide an improved system of detonation detection and indication for use with the multicylinder engines used in aircraft, whereby the operating conditions within all of the cylinders of the engine may be made known to the operator.

Still another object of the present invention is to provide improved means for coupling the ionization gaps to the detonation detector in an ionization type detonation detection system where the gaps are at a distance from the detector.

Another object of the present invention is to provide an improved detonation detection system which produces indication not only of the occurrence of detonation, but also of its frequency of occurrence.

In an internal combustion engine, the reduction below a certain value of the fuel-to-air ratio of the combustible mixture supplied to the cylinders will cause the occurrence of secondary explosions, called detonations. The value of the fuel-to-air ratio below which detonation occurs depends on several variable factors, such as type and composition of fuel, engine load, etc. For a given, constant set of operating conditions, however, there is a fixed value of the fuel-to-air ratio below which detonation will occur. Operating an internal combustion engine in a detonating condition leads to destruction of the pistons and cylinders, while operating the engine at a fuel-to-air ratio in excess of that required to just prevent the occurrence of detonation results in low efficiency of operation and a consequent waste of fuel.

For a stationary or vehicular internal combustion engine, the sounds which accompany detonation can often be detected aurally. Therefore, by utilizing these aural indications, the engine operator can reduce the fuel-to-air ratio of the engine mixture until detonation occurs. The operator can then raise this ratio slightly until the detonation just ceases, causing the engine to operate with the least possible rate of fuel consumption and, therefore, maximum efficiency for the prevailing conditions under which the engine is operating.

For an aircraft engine, the detection of the occurrence of detonation by listening for the sounds accompanying such a phenomenon is made impossible by the high noise level prevailing in a flying aircraft. In order to assure non-detonating operation, and thereby preclude the possibility of damage to the engine from this cause, the fuel-to-air ratio of the supplied mixture is maintained at values which are known to be in excess of those values which are required to just prevent detonation under various operating conditions. Although this procedure provides detonation-free operation, it results in excessive fuel consumption, which is not only costly, but also limits the flying range of the aircraft for a given fuel carrying capacity. From this it can be seen that a system for detecting detonation, without depending on the accompanying sounds, is highly desirable. With such a system, aircraft engines can be operated with fuel-to-air ratios just high enough to prevent detonation, yet not so high as to cause excessive, unnecessary rates of fuel consumption. Such operation leads to savings in fuel costs, and what is more important, increases the flying range of aircraft for given fuel carrying capacities.

There have been proposed in the prior art several methods for detecting detonation in internal combustion engines, and apparatus has been disclosed which operates according to these methods, employing such detecting devices as pressure pick-ups, vibration pick-ups, bouncing pins and contacts, etc. These types of detectors are often seriously affected in their operation by extraneous vibrations, such as the closing of the engine valves, and the pressure indicator type is further affected by the corrosive action of the cylinder gases with which the pressure detecting unit is in contact.

It has been shown that the ionization of the gases within the cylinder of a spark ignited engine exhibits a qualitative change of pattern when the engine is detonating from the pattern which exists when the engine is operating normally and without detonation.

The detection of the occurrence of detonation by detecting these qualitative changes in the ionization pattern of the burning gases in the cylinders of an internal combustion engine has been proposed in the prior art, such a method of and apparatus for detonation detection being disclosed in the copending application of Thomas R. Harrison, Serial No. 661,203, dated April 11, 1946, now Patent No. 2,523,017. Other apparatus forms are disclosed in the application of Herbert A. Clarke, Serial No. 661,201, dated April 11, 1946, now Patent No. 2,517,976. The present invention relates to improvements in apparatus of the above type having certain desirable features such as increased sensitivity, positive indication of detonation, freedom from uncertain operation, and indication of the relative magnitude and frequency of occurrence of detonation.

In an internal combustion engine, when the cylinder gases are ignited, they burn, and the accompanying ionization causes them to become electrically conductive. In a non-detonating cylinder, the ionization intensity rises to a maximum at a comparatively rapid rate and then gradually diminishes during the power stroke of the engine. The ionization pattern thus produced comprises a series of relatively large fluctuations or surges of ionization, one surge for each firing of the cylinder, whose rate of ocurrence is dependent upon the speed of operation of the engine.

When detonation takes place, it does so at a time shortly after the ionization intensity has reached its maximum value, occurring therefore, while the ionization intensity is decreasing. The occurrence of detonation is accompanied by the occurrence of a train of relatively low valued, high frequency, damped oscillations or fluctuations of ionization superimposed on the descending portion of the ionization fluctuation or surge caused by combustion. The ionization pattern thus produced comprises the same series of relatively large ionization fluctuations or surges caused by combustion, but in addition on the descending portions of these fluctuations there will be superimposed the relatively low valued, high frequency train of damped oscillations indicative of detonation. Thus upon the occurrence of detonation, a qualitative change takes place in the ionization pattern.

In the present invention, the changes in conductivity of the cylinder gases which result from changes in ionization of the latter cause corresponding changes in an electrical current which is caused to flow between a pair of electrodes located in the cylinder. This varying current is fed into a discriminating and amplifying circuit, wherein the effects of the surges of current caused by the above mentioned ionization surges are suppressed. However, the relatively high frequency damped oscillations or fluctuations of the current, caused by the fluctuations of ionization accompanying detonation, are not suppressed, but are separated from the signal resulting from the suppressed surges of combustion and are amplified and caused to actuate an indicating device, such as a neon glow lamp, thereby providing an indication of the occurrence of detonation, or of the occurrence of an intensity of detonation exceeding a predetermined desired value.

When a detonation detector of the type described above is operatively connected to an internal combustion engine, the engine operator can decrease the fuel-to-air ratio of the combustible mixture supplied to the engine until the detonation indicator signals that a further reduction in this ratio will cause an undersirable intensity of detonation to occur. This permits the engine to be operated with a minimum fuel consumption rate, without the danger of serious detonation occurring.

Since the present invention requires the installation in one or more of the cylinders of only a substantially rugged, simple ionization-gap plug, it is suitable for use with aircraft engines where simplicity of installation, minimum maintenance, positive indication, and dependable operation are prime requisites. Further, the present invention is insensitive to extraneous vibrations, and is, therefore, not effected in its operation by such disturbances.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which are illustrated and described preferred embodiments of the invention.

Of the drawings:

Fig. 1 is a circuit diagram of an improved system for detecting detonation embodying the features of novelty of the present invention;

Figs. 3 and 4 are typical plate characteristic curves for one of the tubes in the circuit of Fig. 1;

Fig. 6 is the circuit diagram of a modification of the circuit of Fig. 1 wherein a different form of discriminating means is employed;

Figure 2:
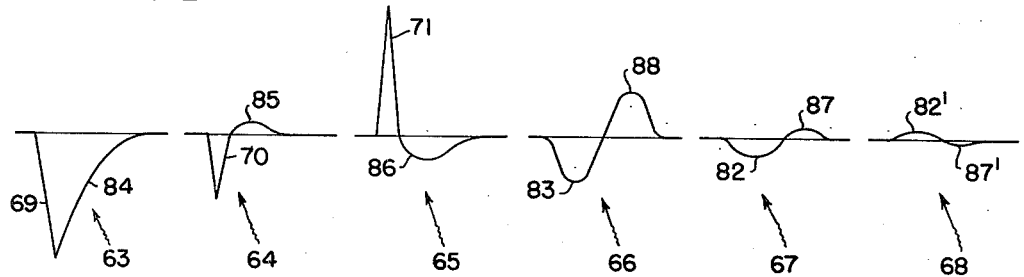
Fig. 2 is a group of curves showing the shapes of signals at various points in the circuit of Fig. 1 for the condition of normal combustion.

Figs. 11, 12, 13, 14, and 15 are circuit showing various methods for coupling the ionization gaps to the detector circuits of Figs. 1 and 6; and Figs. 16 and 17 are circuit diagrams showing other modifications of the circuits of Figs. 1 and 6, respectively.

The detonation detection system circuit shown in Fig. 1 comprises an ionization gap circuit portion 1, a detecting, discriminating, and amplifying portion 2, an indicating portion 3, and a direct voltage supply portion 4. The gap circuit 1 consists of a plurality of ionization gaps, one of which is shown at 5, and a suitable gap-connecting harness, a portion of which is shown by the section of shielded cable 6, comprising an insulated conductor 7 and a metallic shield 8. The ionization gap 5, located in one of the cylinders of the engine, not shown, is formed between an insulated central electrode 9, and the interior surface of the cylinder wall 10 through which the electrode 9 passes. The wall surface 10 forms the other electrode of the gap 5, and is grounded through the frame of the engine as at the point G. The shield 8 of the cable 6 is also grounded by connection to the engine frame as at the point G', and the electrode 9, as well as the other corresponding electrodes, not shown, are connected to the conductor 7.

The detecting, discriminating, and amplifying circuit 2 comprises vacumm tubes 11, 12, and 13, and various other circuit components to be hereinafter named and described. The vacuum tubes 11 and 12 are of the pentode type, such as the type 6SJ7, each tube having a plate, a suppressor grid, a screen grid, a control grid, a cathode, and a heater filament. The tube 13 is of the beam tetrode type, such as the type 6V6, having a plate, a screen grid, a control grid, a cathode, a heater filament, and beam-forming plates, these latter being connected internally to the cathode.

The indicating circuit 3 comprises a plate load resistance 14, a current-limiting resistance 15, and a neon glow lamp 16. The direct voltage supply circuit 4 comprises a multiple-secondary power transformer 17, a rectifying vacuum tube 18, and various other circuit components to be hereinafter named and described. The vacuum tube 18 is of the full wave rectifying type, such as the type 5Z4, having a first plate, a second plate, and a directly heated cathode or filament.

The power transformer 17 comprises a primary winding 19, a high voltage secondary winding 20 which is center-tapped at 21, a rectifier filament voltage winding 22 which is center-tapped at 23, and a heater voltage winding 24 which is center-tapped at 25. The primary winding 19 is supplied with energizing voltage from a suitable alternating current source, not shown, by the conductors 26 and 27.

The heater filaments of the tubes 11, 12, and 13 receive their energizing voltage from the low voltage heater winding 25 to which the tube heater filaments are connected by the conductors X and Y, partially shown. The filament of the rectifier tube 18 is connected across the low voltage winding 22, from which it receives its energizing voltage. The center-taps 21 and 25 of the windings 20 and 24 respectively, are connected to ground through a ground bus 28, which is grounded to the engine frame at the point G'.

The two plates of the rectifier tube 18 are connected, respectively, to the opposite ends of the secondary winding 20, and the center-tap 23 of the rectifier filament winding 22 is connected to one end of a filter reactance 29. This end of the reactance is also connected to ground through a filter condenser 30 and the bus 28. The opposite end of the reactance 29 is connected to a point 31, which point is connected to the ground bus 28 through a load resistance 32 and a filter condenser 33, connected in parallel therewith. When the primary winding 19 of the transformer 17 is energized by an alternating voltage, there appears across the resistance 32, between the point 31 and the bus 28, a uni-directional voltage having a small component of alternating ripple voltage. The operation of the rectifier and filter circuit just described to produce this uni-directional voltage from the alternating voltage supplied to the transformer 17 is well known to those skilled in the art, and need not be described here.

The voltage across the resistance 32 is further filtered by the resistances 34 and 35 and the condensers 36 and 37, one end of the resistance 34 being connected to the point 31, and its other end being connected through the resistance 35 to a point 38. The condenser 36 is connected between the junction of the resistances 34 and 35 and the bus 28, and the condenser 37 is connected between the point 38 and the bus 28. The voltage between the point 38 and the bus 28, therefore, has a substantially smaller ripple component than has the voltage across the resistance 32. The action of the latter filter circuit in smoothing out the ripple component of the direct voltage is well known to those skilled in the art, and need not be described here.

Referring to the circuit portions 1 and 2 of Fig. 1, the ionization gap electrodes, such as the one shown at 9, are connected to one side of a coupling condenser 39 by the conductor 7 of the harness cable 6. These electrodes are supplied with a positive potential with respect to ground by their connection to the point 38 through a resistance 40.

The opposite side of the coupling condenser 39 is connected to one end of a variable grid resistance 41, the other end of the latter being connected to the bus 28. The slider of the resistance 41 is connected to the control grid of the tube 11. Therefore, it can be seen that the electrodes 9 of the ionization gaps are connected to the control grid of the tube 11 through the coupling condenser 39 and the variable grid resistance 41.

The screen grid of the tube 11 is connected to the point 38 through a screen grid resistance 42, and to the bus 28 through a screen grid by-pass condenser 43. The suppressor grid and the cathode of the tube 11 are connected together, and are grounded through a cathode bias resistance 44 and a cathode by-pass condenser 45, these latter two units being connected in parallel.

The plate of the tube 11 is connected to the point 38 through a plate load resistance 46, and is also connected to the control grid of the tube 12 through a coupling condenser 47 and to the screen grid of the tube 12 through a resistance 48. The screen grid of the tube 12 is connected to the bus 28 through a by-pass condenser 49, and the control grid of this tube is connected to the bus 28 through a grid resistance 50.

The suppressor grid and cathode of the tube 12 are connected together, and are connected to the bus 28 through a cathode bias resistance 51 and a cathode by-pass condenser 52, these latter two units being connected in parallel.

A parallel resonant, tuned circuit, comprising an inductance 53 and a condenser 54 connected in parallel therewith, is connected between the plate of the tube 12 and one end of a resistance 55, the other end of the latter being connected to the point 31 in the direct voltage supply circuit 4. A condenser 56 is connected between the junction of the tuned circuit and the resistance 55 and the bus 28.

The plate of the tube 12 is also connected to the control grid of the tube 13 through a coupling condenser 57 and a variable grid resistance 58, one side of the condenser 57 being connected to the plate of the tube 12, and the other side being connected to the bus 28 through the resistance 58, the slider of the latter being connected to the control grid of the tube 13. The screen grid of this latter tube is connected to the point 31 through a screen grid resistance 59, and is connected to the bus 28 through a by-pass condenser 60. The cathode of the tube 13 is connected to the bus 28 through a cathode bias resistance 61 and a cathode by-pass condenser 62, these latter two units being connected in parallel.

The plate of the tube 13 is connected to the point 31 through the plate load resistance 14, and is connected through the current-limiting resistance 15 to one plate of the neon glow lamp 16. The other plate of the latter is connected to the bus 28.

The values of the components of the circuit of Fig. 1 are so chosen that when there is no signal being impressed on the circuit 2 from the ionization gap circuit 1, as occurs when there are little or no burning gases in the engine cylinders, the tube 11 conducts sufficient current to produce a considerable voltage drop across the plate load resistance 46. This maintains the screen grid of the tube 12 at a low potential with respect to ground, resulting in operation of the tube 12 at a very low value of voltage amplification, as will be explained hereinafter. As a result of this, there is no signal impressed on the grid of the tube 13, hence this tube is caused to conduct a certain fixed value of plate current. The values of the circuit components are so chosen as to cause this fixed plate current to produce across the plate load resistance 14 a potential drop sufficient to lower the plate potential with respect to ground to a value which will not be sufficient to cause the neon glow lamp 16 to fire. Therefore, with no signal impressed on the input to the circuit 2, the neon glow lamp 16 is not lighted.

In Fig. 2 are shown sketches of typical oscilloscopic patterns of the wave shape of the signal voltage produced by normal combustion. Curve 63 shows the normal combustion signal across the ionization gap 5, curve 64 shows this signal as it appears between the control grid of the tube 11 and ground, curve 65 shows it as it appears between the control grid of the tube 12 and ground, curve 66 shows it as it would appear between the control grid of the tube 13 and ground if there were no tuned circuit in the preceding stage, curve 67 shows the signal between the grid of the tube 13 and ground with a tuned circuit providing band-pass filter action in the preceding stage, this circuit being tuned to attenuate all frequencies outside of a given band, and curve 68 shows the normal combustion signal as it appears between the plate of the tube 13 and ground. These curves show only the changing potentials between the points indicated, any steady, direct values of voltage being eliminated from the oscilloscopic traces by the blocking action of the condenser located in series with the input to the oscilloscope.

When combustion occurs in a cylinder of the engine, for example the cylinder containing the ionization gap 5, the gases within the cylinder undergo a rapid increase in ionization, which results in a corresponding decrease in the resistance existing between the electrodes 9 and 10 of the gap 5. This decreased resistance causes a current to flow in the gap circuit through the resistance 40, producing across this resistance a potential drop which lowers the potential of the electrode 9 with respect to ground. This decrease in potential, shown by the portion 69 of the curve 63 of Fig. 2, tends to swing the control grid of the tube 11 negative, but due to the flow of electrons from the charged condenser 39 through the resistance 41, the control grid is swung negative to a lesser extent than it tends to be driven, as shown by the descending portion of the signal pulse 70 of the curve 64.

As the burning of the gases in the cylinder subsides, the ionization decreases, the ionization gap resistance increases, and the potential between the gap electrodes increases. This increase is shown by the portion 84 of the curve 63. The control grid of the tube 11 is thereby swung in a positive direction as shown by the returning portion of the pulse 70 of curve 64. However, due to the electrical inertia of the circuit comprising the condenser 39, the control grid of the tube 11 is swung somewhat positive as shown by the portion 85 of the curve 64. As the ionization gap signal of the curve 63 returns to its initial zero value, the signal on the control grid of the tube 11 also returns to its initial zero value. The resulting positive signal pulse 85 on the control grid of the tube 11 is of a considerably smaller magnitude than the negative pulse 70.

A steep wave front signal applied to a tuned circuit tends to shock excite the circuit, causing it to produce oscillations of its own. Such oscillations interfere with any relatively weak, higher frequency signals which may follow the steep wave front, and prevent these signals from being separated by the tuned circuit from the steep wave front signal. It is desirable, therefore, to suppress the steep wave front signal so that any superimposed, higher frequency signals can be detected and amplified.

The negative signal pulse 70 on the control grid of the tube 11 is amplified by this tube, and the resulting signal applied to the control grid of the tube 12 is in the form of a positive signal pulse 71 as shown on the curve 65. This positive control grid pulse is partially suppressed by the tube 12 by a time delay action which prevents the tube 12 from becoming sensitive until the positive control grid swing 71 has dropped to a sufficiently low value so as not to shock excite the following tuned plate circuit. As was mentioned above, when there is no signal being impressed on the grid of the tube 11, the plate current flowing in this tube keeps the voltage on the screen grid of the tube 12 at a very low value, causing the latter to be insensitive. Therefore, the tube 12 operates in the manner shown by the plate characteristic curves 72 and 73 of Fig. 3. These curves are typical examples of members of a family of curves which show the relation between the plate voltage and the plate current of the tube 12, operating with low screen grid voltage, for various control grid voltages, other conditions remaining constant. Specifically, the plate characteristic 72 shows plate current vs. plate voltage for a certain control grid voltage $Eg'$, while the characteristic 73 shows this current-voltage relationship for a much more positive value of control grid voltage, $Eg''$. These characteristics, representing a large swing in grid voltage equal to $Eg''$ minus $Eg'$, are seen to be located close together, and near to the plate voltage axis, due to the low scren grid voltage applied to the tube.

The curve 74 of Fig. 3 represents the load line for the tube 12 under the existing condition of plate load resistance. This load line 74 is a locus of points on the various plate characteristics, which points correspond to values of plate current and respective plate voltage which exist for various control grid voltages for a certain, fixed value of plate load impedance. By dropping vertical lines to the plate voltage axis from the respective points of intersection of the characteristics 72 and 73 with the load line 74, the intersection of these lines with the voltage axis at the points 75 and 76 respectively will indicate the magnitudes $Ep'$ and $Ep''$ of the plate voltage corresponding to the control grid voltages $Eg'$ and $Eg''$ respectively. Thus it is seen that the condition of low screen grid voltage renders the tube 12 highly insensitive by causing a large control grid voltage swing $Eg''$ minus $Eg'$ to produce only a small plate voltage swing $Ep'$ minus $Ep''$.

From the above, it is evident that the tube 12 will be insensitive to the large positive swing of control grid voltage shown by the portion 71 of curve 65 which is impressed upon it; therefore, the swing will not be amplified, and no corresponding signal will be sent to actuate the neon glow lamp indicator 16.

When the signal portion 70 of curve 64 is impressed on the grid of the tube 11 as previously explained, it swings this grid more negative with respect to ground, causing the plate current flowing through the plate load resistance 46 to decrease rapidly in magnitude. This causes the potential on the plate of the tube 11 to rise, which tends to raise the potential on the screen grid of the tube 12. This tendency is prevented at first, however, by the current flowing to charge the timing condenser 49, this current flowing through the timing resistance 48 and producing across the latter a voltage drop which prevents the screen grid of the tube 12 from immediately swinging more positive. As the condenser 49 becomes charged, however, the current and hence the voltage drop across the resistance 48 are reduced, and the potential on the screen grid rises accordingly. The values of the timing condenser 49 and timing resistance 48 are so chosen that the screen grid voltage reaches the value giving maximum sensitivity to the tube 12 at the time when the positive signal 71 on the grid of this tube has dropped to a sufficiently low value. This high value of screen grid voltage then permits operation of the tube 12 as shown by the plate characteristics 77 and 78 of Fig. 4. These characteristic curves are similar to the curves 72 and 73, respectively, of Fig. 3, except that the curves of Fig. 3 are for a low value of screen grid voltage, while those of Fig. 4 are for a high screen grid voltage. The curve 77 is for the same value of control grid voltage $Eg'$ as that of the curve 72, and the curve 78 is for the same value of control grid voltage $Eg''$ as that of the curve 73. In Fig. 4, the load line 79 is identical with the load line 74 of Fig. 3, since no change in plate circuit load resistance has occurred. Therefore, in Fig. 4, if vertical lines are dropped from the respective intersections of the characteristics 77 and 78 with the load line 79 to the plate voltage axis, the respective intersections 80 and 81 of these lines with the voltage axis indicate the plate voltages $Ep^3$ and $Ep^4$ corresponding to the control grid voltages $Eg'$ and $Eg''$ respectively. Thus it is seen that now the control grid voltage swing $Eg''$ minus $Eg'$ produces a large plate voltage change $Ep^3$ minus $Ep^4$, as compared with the small plate voltage change $Ep'$ minus $Ep''$ which occurred when low screen grid voltage prevailed.

The above values of control grid and plate voltage are used merely as examples to show the tube 12 passing from an insensitive state to a sensitive one upon an increase in its screen grid voltage. Actually, by the time the tube 12 becomes sensitive, its grid has only a small signal remaining on it, which is amplified and produces the small signal portion 82 of the curve 67. This curve 67 shows the signal as applied to the control grid of the tube 13, after the signal has been smoothed out by the band-pass filter action of the tuned plate circuit, which circuit is tuned to amplify only those frequencies of the signals produced by detonation. Were this tuned circuit not included, the signal on the control grid of the tube 13 would appear as the portion 83 of the curve 66, which shows a more peaked, steeper wave front signal than does the curve 67. The curve 66 is included merely to show the pulse-reducing action of the tube 12, and to indicate the need of a tuned plate, a band-pass filter circuit.

The portion 82 of the signal 67 on the control grid of the tube 13 is amplified somewhat by this tube, appearing in the plate circuit in the form shown by the portion 82' of the curve 68. The constants of the output circuit are such that this signal does not increase the plate potential sufficiently to fire the neon glow lamp 16.

The positive signal pulse 85 on the control grid of the tube 11 is amplified by this tube, and the resulting signal produces a small negative pulse 86 on the control grid of the tube 12 as shown by the curve 65. Although the tube 11 is once more conducting current and hence its plate voltage has fallen, the screen grid voltage on the tube 12 is still fairly high, but is falling slowly, due to the discharging of the timing condenser 49. Therefore, the pulse 86 applied to the control grid of the tube 12 from the tube 11 is amplified and appears on the control grid of the tube 13 as the portion 87 of the curve 67. Were it not for the band-pass filter action of the tuned plate circuit of the tube 12, this pulse would appear as the portion 88 of the curve 66.

The signal portion 87 on the control grid of the tube 13 is amplified somewhat, and appears in the plate circuit in the form shown by the portion 87' of the curve 68. Again, this signal is not sufficient to fire the neon glow lamp 16.

It is evident from the above that the circuit of Fig. 1 responds to the normal combustion signal in such a manner as to be insensitive to the initial, steeply rising wave front portion of the signal, but to become sensitive to any relatively higher frequency signals which may follow the initial steep front portion. Since no such higher frequency signals are present in the normal combustion signal no signal is amplified which will cause an indication to be given by the neon glow lamp indicator.

Figure 5:
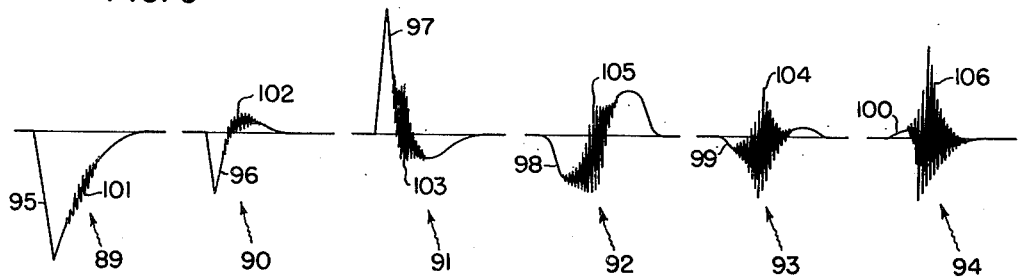
Fig. 5 is a group of curves corresponding to the group of Fig. 2 and showing the signal shapes for the condition of detonating combustion.

In Fig. 5 are shown a group of sketches of typical oscilloscopic patterns of the wave shape of the signal voltage produced by combustion accompanied by detonation. These patterns or curves are similar to the curves of Fig. 2 for the non-detonating condition of combustion, the curves of Fig. 5 being those of signals appearing at the same points in the circuit of Fig. 1 at which the corresponding curves of Fig. 2 appear. In Fig. 5, therefore, the curve 89 is for the signal across the ionization gap 5, the curve 90 is for the signal on the control grid of the tube 11, the curve 91 is for the signal on the control grid of the tube 12, the curves 92 and 93 are for the signal on the control grid of the tube 13, without and with the band-pass filter action of the associated tuned plate circuit of the tube 12 respectively, and curve 94 is for the signal on the plate of the tube 13, all of these curves representing the signals of detonating combustion.

As seen from the curve 89 of Fig. 5, the combustion signal across the gap 5 has a steeply rising initial portion 95 which is the same as for the non-detonating case. Therefore, the response of the circuit of Fig. 1 is the same for this portion 95 of the input signal as it is for the portion 69 of the non-detonating curve 63. Hence, the tube 11 is made less conductive by the rising signal portion 96 of the curve 90, which causes charging of the timing condenser 49. The signal portion 97 appearing on the control grid of the tube 12 is amplified only slightly, since it arrives while the tube 12 is still insensitive, and has dropped to a very small value by the time that the condenser 49 has become sufficiently charged to raise the screen grid voltage to cause the tube 12 to become sensitive and to amplify. Thus the signal appears on the control grid of the tube 13 as the portions 98 and 99 of the curves 92 and 93 without and with band-pass filtering respectively. This signal then appears as before on the plate of the tube 13 as shown by the portion 100 of the curve 94, being insufficient to cause firing of the neon glow lamp 16.

Upon the occurrence of detonation, there appears on the descending portion of the combustion signal curve a superimposed, relatively high frequency, damped signal, which is of very small magnitude compared to the combustion signal. This superimposed detonation signal is shown on the portion 101 of the curve 89. As shown by the curve portion 102 of curve 90, the detonation signal is passed by the input filter circuit and appears on the control grid of the tube 11. This tube amplifies the signal causing it to be impressed on the control grid of the tube 12 as shown by the portion 103 of the curve 91. Since the tube 12 is sensitive at this time, due to the maintainance of its screen voltage at a high value by the discharging of the condenser 49, the signal is amplified, and due to the band-pass action of the tuned plate circuit of the tube 12, the high frequency detonation portion is amplified to a much greater extent than is the lower frequency, base portion. This produces on the control grid of the tube 13 a signal portion as shown at 104 on the curve 93, the plate circuit of the tube 12 being tuned to amplify only those signals within the frequency range of the detonation signal. Were it not for this tuned circuit, the signal would appear as the portion 105 of the curve 92, which shows that the base combustion signal is amplified to nearly as great an extent as is the high frequency detonation signal.

The signal portion 104 appearing on the control grid of the tube 13 is amplified by the latter, the resulting plate signal being as shown by the portion 106 of the curve 94. The positive portion of this alternating signal cooperates with the direct potential of the plate with respect to ground to raise this potential to a value sufficient to cause the neon glow lamp 16 to fire. Thus an indication of the presence of the detonation signal and of the occurrence of the detonation is given by the flashing of the neon glow lamp. As the combustion cycle nears completion, the high frequency detonation signal disappears, the potential of the plate of the tube 13 drops, and the neon glow lamp is extinguished.

The time elapsing between the arrival of the signal pulse on the control grid of the tube 12 and the time of the tube 12 becoming sensitive depends primarily on the values of the timing condenser 49 and resistance 48. These values are so selected as to cause a time delay which corresponds to the duration of the active portion of the initial pulse. However, an adjustment of the duration of the time delay is possible by adjusting the slider on the resistance 41, thereby regulating the amount of signal impressed on the control grid of the tube 11 and hence regulating the screen grid voltage applied to the tube 12. The variable resistance 41 also gives control of the intensity of detonation at or above which the neon glow lamp will give an indication, as does the variable resistance 58. These resistances also permit adjustment of the circuit to prevent the normal combustion signal from firing the neon glow lamp.

In Fig. 6 there is shown the circuit diagram for a detonation detector which is similar to that of Fig. 1, but which embodies certain desirable modifications. The primary difference between the detectors of Fig. 1 and 6 lies in the difference in method and circuit employed to suppress the effects of the initial steep wave front of the combustion signal which would otherwise make detection of the detonation signal impossible. In the circuit of Fig. 6, the reference numerals which are identical with those of Fig. 1 refer to parts which are identical or equivalent to the corresponding parts of Fig. 1. The circuit of Fig. 6 employs no time delay portion for discriminating against the initial steep wave front signal, but instead it operates to cut off the pulse resulting from this wave front, the tube 12 being arranged to be driven past cut-off and hence made insensitive by the signal pulse. Therefore, the timing condenser 49 and timing resistance 48 of the circuit of Fig. 1 are eliminated in the circuit of Fig. 6, and in the latter figure the tube 12 is supplied with constant screen grid voltage by the screen grid resistance 107 connected between the screen grid and the junction between the parallel resonant plate circuit and the resistance 55. A by-pass condenser 108 is connected between the screen grid and the ground bus 28.

The cathode bias resistance 51 and associated condenser 52 are eliminated from the cathode circuit of the tube 12, the cathode being connected directly to the bus 28. The tube 12 is supplied with negative grid biasing voltage by a grid bias voltage supply circuit, comprising a vacuum tube 109, a filter resistance 110, filter condensers 111, 112, and 113, and a variable voltage dividing resistance 114.

The tube 109 is of the twin triode type, such as the type 6N7, comprising two sets of triode elements in a signal envelope. Each triode section comprises a plate, a control grid, a cathode, and a heater filament. The grid and associated cathode of one triode section are connected together and to one end of the high voltage secondary winding 20 of the transformer 17. The grid and cathode of the other triode section are connected together and to the other end of the winding 20. The heater filaments of the two triode sections are connected in parallel within the tube, and are supplied with energizing voltage by the winding 24 of the transformer 17 through the partially shown conductors X and Y.

The plates of the two triode sections are connected together and to one end of the filter resistance 110. These plates are also connected to the ground bus 28 through the filter condenser 111. The other end of the resistance 110 is connected to one end of the resistance 114, and to one end of the gap voltage resistance 40, the other end of the latter being connected to the electrode 9 of the ionization gap 5 as before. The other end of the resistance 114 is connected to the bus 28, and the filter condenser 112 is connected in parallel with the resistance 114. The slider of the latter is connected to the control grid of the tube 12 through the grid resistance 50, and the condenser 113 is connected between this slider and the bus 28.

The tube 109 serves as a full wave rectifier, supplying to the bias voltage filter circuit a pulsating direct voltage which is negative with respect to the ground bus 28. This voltage is smoothed out by the filter circuit in the usual manner, and is used to supply negative bias to the tube 12 and to produce a potential drop across the gap 5 such that the electrode 9 is negative with respect to the cylinder-wall electrode 10.

Figure 7:
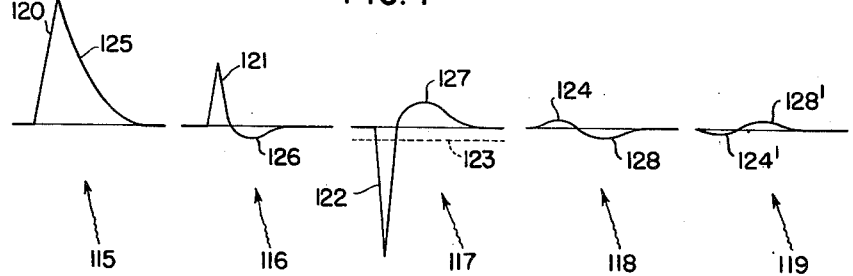
Figs. 7 and 8 are reproductions of typical signal shapes occurring in the circuit of Fig. 6.

In Fig. 7 are shown sketches of typical oscilloscopic patterns of the wave shape of the signal voltage produced by normal combustion of the gases in the cylinder containing the ionization gap 5 of the circuit of Fig. 6. The curve 115 shows the normal combustion signal across the gap 5, curve 116 shows this signal as it appears on the control grid of the tube 11, curve 117 shows it as it appears on the control grid of the tube 12, curve 118 shows it on the control grid of the tube 13, and curve 119 shows it as it appears between the plate of the tube 13 and ground. These curves show only the changing potentials, with respect to ground, at the points indicated, any steady, direct voltages not appearing in the patterns, due to the blocking action of the condenser connected in series with the input to the oscilloscope.

In the operation of the detonation detecting system of Fig. 6, the occurrence of combustion in an engine cylinder, for example the cylinder containing the ionization gap 5, causes a rapid increase in the ionization of the cylinder gases, which in turn lowers the resistance existing between the gap electrodes 9 and 10 and, therefore, reduces the potential between them as before. This results in a sharp rise of the potential on the electrode 9 with respect to ground, since this electrode is normally maintained at a high negative potential with respect to ground. This rise in potential is shown by the portion 120 of the curve 115 of Fig. 7, only the changing values or signals being shown in this figure. Due to the differentiating action of the condenser 39, as explained for the circuit of Fig. 1, this signal appears on the control grid of the tube 11 as the smaller positive swing 121 of the curve 116.

After the initial sharp increase in cylinder gas ionization, the burning and hence the ionization subside, once more increasing the resistance between the ionization gap electrodes, and thereby reducing the potential on the electrode 9 with respect to ground. This negatively directed gap potential swing, shown by the portion 125 of the curve 115, swings the control grid of the tube 11 in a negative direction as shown by the descending portion of the positive pulse 121 of the curve 116. However, the electrical inertia of the input circuit causes the control grid of the tube 11 to be swung slightly negative with respect to its cathode, as shown by the portion 126 of the curve 116. Upon the return of the gap voltage to its initial zero value as shown by the curve 115, the potential of the control grid of the tube 11 also returns to its initial zero value, the resulting negative signal pulse 126 being considerably smaller in magnitude than the positive pulse 121.

The intial positive signal pulse 121 on the control grid of the tube 11 is amplified by this tube, producing on the control grid of the following tube 12 a large negative pulse as shown by the portion 122 of the curve 117. This pulse is produced by the negative swing of the plate of the tube 11, which is caused by the surge of current which flows in this plate circuit as a result of the positive swing of its associated control grid in the response to the positive pulse 121 impressed upon the latter.

The tube 12 is normally biased close to cut-off, the resistance 114 being adjustable to permit a suitable negative voltage to be applied to the control grid of the tube 12 to accomplish this biasing. Any signal impressed on this control grid which drives it negative below the cut-off line 123 on the curve 117 will cause the tube to stop conducting, reducing its sensitivity to zero. As shown by the curve 117, the negative pulse signal 122 impressed on the control grid of the tube 12 drives the tube far below cut-off, rendering the latter momentarily insensitive, and causing a signal such as the portion 124 of the curve 118 to be impressed on the control grid of the following tube 13. Thus the sharp pulse is clipped off and eliminated, and it cannot, therefore, excite the tuned plate circuit of the tube 12 into producing interfering local oscillating signals. Once the pulse is eliminated, the resulting small signal peak is smoothed out by the filter action of the tuned plate circuit, which is tuned, as before, to pass only the higher band of frequencies containing the detonation signal frequency.

The portion 124' of the curve 119 shows the signal as it finally appears on the plate of the tube 13. This signal is not of sufficient magnitude to cause the plate potential to be raised the necessary amount to fire the neon glow lamp 16.

The signal pulse 126 on the control grid of the tube 11 is amplified by this tube, the resulting signal 127 of curve 117 being impressed on the control grid of the tube 12. In this stage, the signal is smoothed out by the tuned plate circuit, and the signal portion 128 is fed to the control grid of the tube 13. From the portion 128' of the curve 119 it is seen that once again the signal appearing on the plate of the tube 13 is insufficient to cause firing of the neon glow lamp 16.

From the above it is evident that the occurrence of normal combustion produces no signal which can cause the neon glow lamp to flash an indication.

Figure 8:
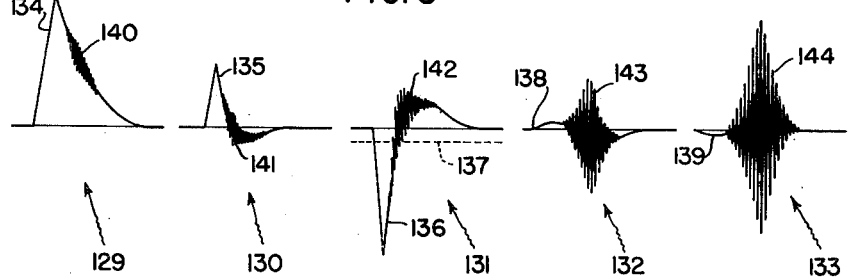

Upon the occurrence of detonation accompanying combustion, the resulting signals appear as shown by the curves of Fig. 8. These signals are the ones appearing at the same points, respectively, as those points at which the corresponding signals of Fig. 7 appear. In Fig. 8 the curve 129 shows the gap signal, the curves, 130, 131, and 132 show the control grid signals on the tubes 11, 12, and 13, respectively, and the curve 133 shows the plate signal of the tube 13.

The gap voltage signal 129 of detonating combustion exhibits the same initial steeply rising portion 134 as does the normal combustion signal 115. The portion 134 of the curve 129 swings the control grid of the tube 11 positive as for nondetonating operation. Similarly as the ionization decreases from its maximum condition the control grid of the tube 11 is swung in a negative direction, producing the positive signal pulse 135, as shown by the curve 130. This signal is amplified by the tube 11, inverted, and applied to the control grid of the tube 12 as shown by the curve 131. Here again the negative pulse 136 drives the control grid of the tube 12 below the cut-off line 137 producing on the control grid of the tube 13 the small positive swing 138 as shown by the curve 132. This latter swing results in the slight negative plate voltage swing 139 of the curve 133 which is insufficient to cause the neon glow lamp 16 to fire.

As explained above in connection with the operation of the circuit of Fig. 1, the occurrence of detonation is accompanied by the occurrence of a relatively high frequency damped oscillating signal which appears superimposed upon the descending portion of the combustion signal. This detonation signal is shown by the portion 140 of the curve 129, and it appears on the control grid of the tube 11 as shown at 141 on the curve 130, being passed by the high-pass filter input circuit, comprising the condenser 39 and the resistance 41, with negligible attenuation. The detonation signal is amplified by the tube 11 and is impressed on the control grid of the tube 12 as shown by the portion 142 of the curve 131. The tube 12 is now conductive and, therefore, sensitive, since the control grid is driven in a positive direction away from the cut-off line 137. Therefore, the detonation signal is amplified by the tube 12, having its amplitude increased considerably with respect to the amplitude of the combustion signal by the high band-pass filter action of the tuned plate circuit. This amplified signal appears on the control grid of the tube 13 as shown at 143 on the curve 132, and is amplified by this tube, appearing on the plate as shown by the portion 144 of the curve 133. The positive swings or peaks of this signal portion 144 raise the plate potential to a value sufficient to cause the neon glow lamp 16 to fire and flash an indication of the occurrence of detonation. Upon the return of the gap signal voltage to its initial zero value, the plate potential of the tube 13 also returns to its initial value and the neon glow lamp is extinguished.

Since the circuit of Fig. 6 does not contain any portion having a fixed time delay characteristic, it is superior to the circuit of Fig. 1 when used in connection with engines giving combustion signals which exhibit variations in the time of duration of the rise of the initial steep front, since it will clip off the peak signal no matter at what time the latter occurs in the combustion cycle.

The variable resistances 41 and 58 of the circuit of Fig. 6 allow adjustment of the signal magnitudes existing in the circuit, making it possible to adjust the system to a certain intensity of detonation, at or above which the neon lamp will flash an indication.

Figure 9:
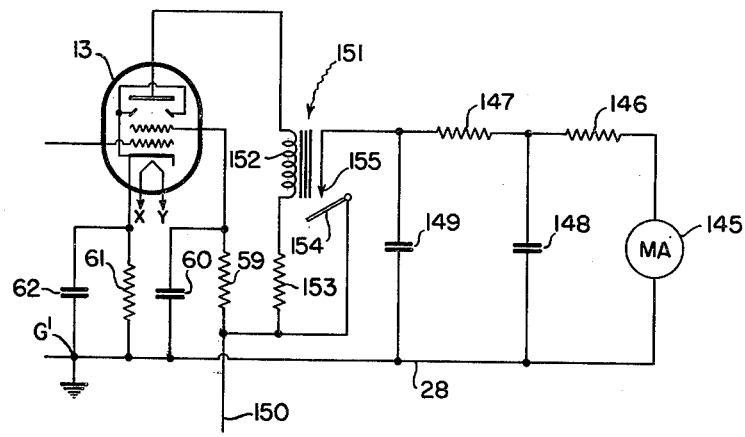
Figs. 9 and 10 illustrate modifications of the indicator circuit of Figs. 1 and 6.

The circuit of Fig. 9 is that of a modification of the output and indicating portion 3 of the circuit of Figs. 1 and 6. In the circuit of Fig. 9, the plate load resistance 14, and the neon glow lamp 16, with its associated current-limiting resistance 15, of Figs. 1 and 6 are eliminated. The circuit shown in Fig. 9 operates to give an indication of the average frequency of occurrence of an intensity of detonation equal to or exceeding any predetermined, desired intensity.

The circuit of Fig. 9 includes the output tube 13, together with its associated screen grid and cathode bias resistances and condensers all as connected and shown in Figs. 1 and 6. Also, the control grid of the tube 13 is connected to the remainder of the circuit of Fig. 1 or 6, not shown in Fig. 9.

A meter 145, which may be any suitable type of direct current milliammeter, is used in the circuit of Fig. 9 as the indicating instrument. This meter is supplied with indicating current from an averaging network comprising resistances 146 and 147, and condensers 148 and 149, this network being suitably connected to the point 31 of the direct voltage supply circuit of Figs. 1 and 6 by a conductor 150. The input to the averaging circuit is controlled by a relay 151, which in turn is operated by the output tube 13.

The plate of the tube 13 is connected to one end of the coil 152 of the relay 151, the other end of this coil being connected to the point 31 of the direct voltage supply circuit through a resistance 153 and the conductor 150. The relay 151 has a pair of normally open contacts 154 and 155, the contact 154 being connected to the direct voltage supply circuit through the conductor 150, while the other contact 155 is connected to one end of the resistance 147. The other end of this resistance is connected to one end of the resistance 146, the other end of which is connected to one terminal of the meter 145. The other terminal of the meter 145 is connected to the ground bus 28. The condenser 149 is connected between the relay contact 155 and the bus 28, and the condenser 148 is connected between the junction of the resistances 147 and 146 and the bus 28.

The components of the circuit of Fig. 9 are chosen so as not to cause the tube 13 to draw sufficient plate current to energize the relay coil 152 when the engine under test is operating without detonation. With the relay de-energized, the contacts 154 and 155 are disengaged and no potential is applied across the meter 145; however, upon the occurrence of detonation of an intensity equal to or exceeding the value for which the detector is adjusted, the tube 13 will be caused to conduct sufficient plate current to energize the relay winding 152. Upon the occurrence of this condition, the contacts 154 and 155 will close, causing a potential to be applied across the input of the averaging circuit. Upon each similar occurrence of detonation, a pulse of voltage is thus applied to the averaging circuit, the latter acting to smooth out these pulses and apply to the meter 145 a substantially constant voltage whose magnitude varies with the frequency of occurrence of the detonation. It is to be noted that the reading obtained from the meter 145 is in no way affected by the instantaneous intensities of the detonations, providing that these intensities are above that for which the instrument is then adjusted.

Figure 10:
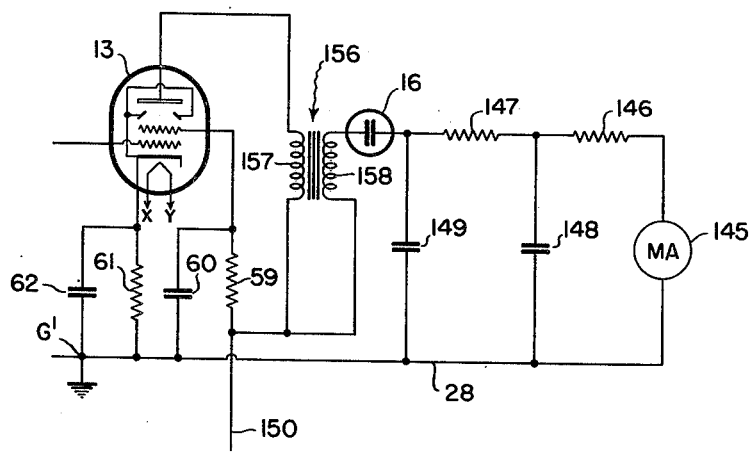

In Fig. 10 is illustrated another modification of the output and indicating portion 3 of the circuit of Figs. 1 and 6, which is similar to the modification of Fig. 9. In Fig. 10 the relay 151 of Fig. 9 is replaced by a transformer 156 comprising a primary winding 157 and a secondary winding 158. Also included in the circuit of Fig. 10 is the neon glow lamp 16 of Figs. 1 and 6, which serves in Fig. 10 to indicate the instantaneous occurrence and relative intensity of detonation.

In Fig. 10, the plate of the tube 13 is connected to the direct voltage supply conductor 150 through the primary winding 157 of the transformer 156. One plate of the neon lamp 16 is connected to the direct voltage supply bus 150 through the secondary winding 158 of the transformer 156. The other plate of the neon lamp 16 is connected to one end of the resistance 147, whose other end is connected through the resistance 146 to one terminal of the meter 145. This latter plate of the neon lamp 16 is also connected to the bus 28 through the condenser 149, and the junction of the resistances 147 and 146 is connected to the bus 28 through the condenser 148. The remaining side of the meter 145 is connected to the bus 28 as before.

The values of the components of the circuit of Fig. 10 are so chosen as to cause the tube 13 to conduct insufficient plate current to cause firing of the neon lamp 16 when the engine under test is operating without detonation. However, upon the occurrence of detonation of an intensity equal to or greater than the intensity for which the instrument is adjusted, sufficient plate current will flow through the transformer winding 157 to cause a voltage to be developed across the secondary winding 158 which will fire the neon lamp 16. When this lamp fires, a pulse of voltage is fed to the averaging circuit, which circuit acts as before to smooth out these pulses the plate of this tube is connected by a conductor, partially shown, to the point 38 of the direct voltage supply circuit 4 of Figs. 1 and 6, not shown in Fig. 15.

In Fig. 16 is illustrated a modification of a portion of the circuit of Fig. 1 wherein an additional vacuum tube 174 is employed to permit further suppression of the steep wave front ionization signal of combustion.

The tube 174 is preferably of the triode-pentode type, such as the type 6P7G, having a triode section 175 and a pentode section 176 contained in a single glass envelope.

In Fig. 16 the plate of the tube 12 is coupled to the control grid of the triode section 175 of the tube 174 through a coupling condenser 177 and a variable grid resistance 178, one end of the resistance 178 being connected to the plate of the tube 12 through the condenser 177 and the other end being connected to ground. The slider of the resistance 178 is connected to the control grid of the triode 175. The plate of the tube 12 is also connected to the positive terminal 31 of the plate voltage supply circuit 4 through a plate load resistance 179.

The plate of the triode 175 is connected to the plate of the pentode 176 and to the control grid of the tube 13, not shown in Fig. 16, through the coupling condenser 57. The tuned, high band-pass filter circuit comprising the condensers 54 and 56, the inductance 53, and the resistance 55, all as connected in Fig. 1, is connected in this plate circuit.

The screen grid of the pentode 176 is connected to the screen grid of the tube 12, and the control grid of the pentode 176 is connected to ground through a grid resistance 180. The suppressor grid of the pentode 176 is connected internally to the common cathode of the triode 175 and the pentode 176, and this cathode is connected to ground through a cathode bias resistance 181 and a cathode by-pass condenser 182 connected in parallel therewith. The heater filament of the tube 174 is connected to the heater winding 24 of the transformer 17 by the conductors X and Y in the same manner as the other heater filaments. The remainder of the components of Fig. 16 bear reference numerals which are the same as the corresponding components of Fig. 1, and all connections in Fig. 16 other than those just described are made as in Fig. 1.

In reference to the circuit of Fig. 1, the signal portion 82 on the control grid of the tube 13 as shown by the curve 67 of Fig. 2 is due in part directly to the effect of the increasing voltage applied to the screen grid of the tube 12 when the latter is caused to become sensitive. In the circuit of Fig. 16, the undesirable effects caused by these changes in the screen grid voltage of the tube 12 are partially eliminated in the plate circuit of the tube 174 by cancellation. To this end, there is produced in the plate circuit of the tube 174 by the pentode 176 a signal component caused by changes in the screen grid voltage of this pentode. Since these screen grid voltage changes are also applied to the screen grid of the tube 12, the signal component just specified will be equal to and in phase with the signal component in the plate circuit of the tube 12 resulting from the same voltage changes in the screen grid voltage of this latter tube. At the same time, however, the triode 175 is caused to produce in the plate circuit of the tube 174 a signal component which is equal, but opposite in phase to the signal component produced by the pentode 176. Consequently, these two signal components in the plate circuit of the tube 174 cancel each other, thus eliminating from the succeeding tube 13 practically all of the undesirable signal due to the changing potential on the screen grid of the tube 12. The signal component produced by the triode 175 is opposite in phase to the signal component produced by the pentode 176 due to the phase inversion accomplished by the triode 175, and the two signal components are made practically equal in magnitude by a proper selection of the values of the components of the circuit.

In Fig. 17 is illustrated a modification of a portion of the circuit of Fig. 6 in which more complete suppression of the effects of the ionization surges of combustion is accomplished. To this end, an additional vacuum tube 183 is employed wherein a large amount of the combustion signal is cancelled. The tube 183 is preferably of the twin triode type, such as the type 6SC7, comprising the triode sections 184 and 185, respectively, contained in a single envelope.

In the circuit of Fig. 17 the tube 11 is operated in a cathode follower circuit, the cathode by-pass condenser 45 of Fig. 1 being eliminated from the circuit of Fig. 17. In this latter figure, the cathode of the tube 11 is coupled to the control grid of the triode section 185 of the tube 183 through a condenser 186 and a resistance 187, these two latter components being connected in series. A high-pass filter network comprising a resistance 188 and a condenser 189 connected in parallel therewith is connected between the control grid of the triode 185 and ground for by-passing from this control grid all relatively high frequency signals such as those accompanying detonation.

The plate of the tube 11 is coupled to the control grid of the triode section 184 of the tube 183 through a coupling condenser 190 and a variable grid resistance 191, one end of the latter resistance being connected to the plate of the tube 11 through the condenser 190 and the other end being connected to ground. The slider of the resistance 191 is connected to the control grid of the triode 184. The common cathode of the triodes 184 and 185 is connected to ground through a cathode bias resistance 192 and a cathode by-pass condenser 193 connected in parallel therewith.

The plates of the triodes 184 and 185 are connected together and to the control grid of the tube 12 through the coupling condenser 47. The latter plates are also connected to the positive terminal 38 of the plate voltage supply circuit 4 through a plate load resistance 194. The heater filament of the tube 183 is connected to the heater winding 24 of the transformer 17 as are the other heater filaments.

The gap circuit 1 of Fig. 17 is not supplied with negative voltage as it is in the circuit of Fig. 6 but rather it is supplied with positive voltage from the positive terminal 38 of the plate voltage supply circuit 4 through the resistance 40.

All other components of the circuit of Fig. 17 bear reference numerals which are the same as those of corresponding components of Fig. 6, and all connections in the circuit of Fig. 17 other than those described above are the same as corresponding connections in Fig. 6.

The basic operation of the circuit of Fig. 17 is analogous to that of Fig. 6 with reference to the and produce a substantially constant voltage across the meter 145 which varies not only with the frequency of occurrence of excessive detonation but also with the average intensity of the excessive detonation. Hence, the reading obtained from the meter 145 is a complete picture of the average detonation conditions, taking into account both magnitude and frequency of occurrence of the detonation.

In Figs. 11, 12, 13, 14 and 15, there are illustrated several modifications of the input circuit of Figs. 1 and 6 which are found to be desirable when the detonation detector of the present invention is employed with certain types of large, multi-cylinder engines. Certain of these circuits have been found to give superior results with certain engines, while others have been found to give superior results with other types of engines.

The purpose of such input circuits, as shown in Figs. 11 to 15 inclusive, is to provide a conductor system of relatively low impedance to be used to connect the various ionization gaps to the input of the detector. Such a low impedance line is advantageous since it is less affected by cable capacity effects and less susceptible to the influences of stray electro-magnetic signals than is a high impedance line connected between the gaps and the detector. Indeed, if a high impedance shielded connecting line of any considerable length is employed, the capacitive effects existing between the conductor and the shielding of the line may be of sufficient magnitude to cause complete attenuation of the high frequency detonation signal before this signal reaches the input to the detector circuit. The use of an unshielded line would, of course, cause introduction into the system of undesirable, extraneous signals which would seriously affect the operation of the system. The ignition system of the engine under test is one of the sources of such possible interference.

The circuit of Fig. 11 comprises a gap-to-line transformer 159 having a high impedance primary winding 160 and a low impedance secondary winding 161, and a line-to-detector transformer 162 having a low impedance primary winding 163 and a high impedance secondary winding 164.

The conductor 7, which is connected to all of the electrodes 9 of the ionization gaps 5, is connected to one end of the primary winding 160 of the gap-to-line transformer 159. The other end of this primary winding is connected by a conductor 165 to the source of gap voltage. One side of the secondary winding 161 of this transformer is connected to ground at the engine, and the other side of this winding is connected through the conductor of the shielded cable 166 to one end of the primary winding 163 of the line-to-detector transformer 162 located at the detector. The other end of the winding 163 is connected to ground as is one end of the secondary winding 164 of this transformer. The other end of this secondary winding is coupled to the grid of the tube 11 of the detector circuit through the condenser 39 and the resistance 41. The harness conductor 7, the cable 166, and the transformers 159 and 162 are shielded to minimize stray pick-up, these shields being connected to ground at suitable points.

In Fig. 12 is illustrated an input circuit modification similar to the modification of Fig. 11 except that in Fig. 12 the ionization gap electrodes 9 are connected to the source of gap voltage through the resistance 40 and are connected to one end of the primary winding 160 of the gap-to-line transformer 159 through a coupling condenser 167. The other end of this primary winding 160 is connected to ground.

In the circuit of Fig. 13 the electrodes 9 of the ionization gaps are connected to one end of the primary winding 160 of the gap-to-line transformer 159, the other end of this winding being connected to one end of the conductor of a shielded cable 168. One end of the secondary winding 161 of this transformer is also connected to this conductor, the other end of the winding 161 being connected to the conductor of the shielded cable 166. At the detector, the other end of the cable 166 is connected to one end of the primary winding 163 of the line-to-detector transformer 162, the other end of this winding being connected to the detector end of the conductor of the cable 168. The secondary winding 164 of the transformer 162 has one end connected to the input of the detector circuit through the condenser 39 as before, while the other end of this winding 164 is connected to the adjacent end of the winding 163 and by the conductor 165 to the source of gap voltage. By the use of this circuit, great freedom from undesirable capacity effects and from stray pick-up is had.

In the circuit of Fig. 14 is employed a system similar to that of Fig. 13 except that in the circuit of Fig. 14 the shield of the cable 166 is not grounded but is insulated from ground throughout the length of the cable and is used as a conductor to replace the conductor of the cable 168 of Fig. 13. The shield is by-passed to ground by a condenser 169. In this circuit only one transmission cable is necessary, thus simplifying the system.

The circuit of Fig. 15 illustrates a gap-matching and connecting system in which is employed a vacuum tube connected in a cathode follower circuit. As is known to those skilled in the art, a vacuum tube employing cathode degeneration operates as a cathode follower circuit in which the cathode follows the swings of the control grid. In such a circuit, the input impedance between the control grid and ground is high whereas the output impedance between cathode and ground is low. The cathode follower circuit is ideal, therefore, for matching the high impedance ionization gap network of the detonation detection system to a low impedance line remotely connecting the gap system to the input of the detonation detector proper.

In the circuit of Fig. 15 the shielded insulated conductor 7 connects the electrodes 9 of the ionization gaps 5 to one side of a coupling condenser 170, the other side of which is connected to the control grid of a triode vacuum tube 171, such as the type 6C5G. The control grid of the tube 171 is also connected to ground through a grid resistance 172, and the cathode of the tube 171 is connected to ground through an unbypassed cathode bias resistance 173. The cathode of the tube 171 is also connected directly to the conductor of the shielded cable 166, which conductor is connected to the control grid of the tube 11 through the condenser 39 and the resistance 41 as before. Thus the transmission of the detonation signal from the ionization gaps is accomplished over a line having a relatively low impedance with respect to its grounded shield. The heater filament of the tube 171 is supplied with energizing voltage by the partially shown conductors X and Y, and portion of the circuit following the control grid of the tube 12. The input circuit of Fig. 17 differs from that of Fig. 6 in that the ionization surges of combustion produce negative pulses on the control grid of the tube 11 rather than positive ones as in the case of the circuit of Fig. 6. However, in the circuit of Fig. 17, the ionization surges of combustion produce negative pulses on the control grid of the tube 12 due to the 180° phase shift occurring in the triode 184. Considering the operation of the circuit of Fig. 17, it can be seen that the negative voltage pulses in the gap circuit due to the ionization surges of combustion are amplified and inverted by the tube 11 as occurs in the circuit of Fig. 6. However, the gain of the tube 11 is less than in the case of the circuit of Fig. 6 due to the absence in Fig. 17 of the cathode by-pass condenser 45. In Fig. 17, however, the addition of the triode 184 provides the necessary amplification to compensate for that not obtained in the tube 11. Thus the signal applied to the control grid of the tube 12 would be comparable to that of Fig. 6 were it not for the action of the circuit comprising the triode 185. The action of the circuit of triode 185 is to feed to the control grid of the tube 12 a signal which has as nearly as possible the same shape as the combustion signal applied to the tube 12 from the triode 184 but which is 180° out of phase with this latter signal. To accomplish this, a signal is taken from the cathode of the tube 11 and coupled to the control grid of the triode 185 which is in phase with the signal on the control grid of tube 11. This signal differs from the original signal on the cathode of the tube 11 in that it does not contain any of the high frequency signals of the type accompanying detonation, these high frequency signals being by-passed from the control grid of the tube 185 to ground by the high-pass filter network comprising the resistance 188 and the condenser 189. For normal combustion with no detonation, the signal applied to the control grid of the tube 12 through the tubes 11 and 184 will be in phase with the gap signal, whereas the signal applied to this control grid from the cathode of the tube 11 through the triode 185 will be 180° out of phase with the gap signal and hence 180° out of phase with the aforementioned control grid signal. By proper adjustment of the resistance 191, these signals on the control grid of the tube 12 can be made nearly to cancel each other, the resulting signal being considerably smaller than either of its original components and due only to phase shift and distortion occurring in the circuit.

For detonating operation, the signal of combustion will be cancelled before reaching the control grid of the tube 12, as occurs in the non-detonating case. However, since there will be no out of phase component of the high frequency detonation signal, due to the action of the filter circuit previously described, this detonation signal will be applied to the control grid of the tube 12 as in the case of the circuit of Fig. 6. The advantage of the circuit of Fig. 17 is seen, therefore, to be the more complete suppression of the signals resulting from the effects of the ionization surges of combustion as applied to the control grid of the tube 12. Elimination of these signals is thereby more easily accomplished by the cut-off and filtering actions of the tube 12.

Subject matter disclosed but not specifically claimed herein is disclosed and claimed in the aforementioned copending applications of Thomas R. Harrison, Serial No. 661,203, and Herbert A. Clarke, Serial No. 661,201.

While, in accordance with the provisions of the statutes, I have illustrated and described the best forms of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention, what I claim as new and desire to secure by Letters Patent, is:

1. In apparatus for detecting detonation in a cylinder of an internal combustion engine comprising a pair of spaced, electrically insulated electrodes adapted to be located within the engine cylinder and adapted when so located to be bridged by the burning gases of combustion therein, means adapted to be connected to a source of energizing voltage, said means including means for passing a unidirectional electrical current between said pair of electrodes, and electronic amplifying means having an input circuit including said pair of electrodes and having an output circuit supplied with energizing voltage by the first mentioned means, said electronic amplifying means comprising a plurality of stages of amplification having electron discharge devices associated therewith and including suppressing means for preventing electrical signals produced in said electronic amplifying means by periodically recurring surges of said electrical current which occur upon the ignition of the cylinder gases and the consequent burning thereof from appearing in said output circuit, the improvement comprising a first electron discharge device included in said amplifying means and having an output circuit and an input circuit coupled to the first mentioned input circuit, whereby the conductivity of said first discharge device is varied in accordance with changes in the magnitude of said electrical current, a second electron discharge device having an output circuit and an input circuit coupled to the output circuit of said first discharge device, whereby signals representative of the changes in said electrical current are applied to said second discharge device for amplification thereby, said second discharge device also including a control circuit coupled to the output circuit of said first discharge device and operative to control the gain of said second discharge device in accordance with the conductivity of said first discharge device, whereby said second discharge device is rendered substantially insensitive to signals produced by the increasing portions of the periodically recurring surges of said electrical current, but is rendered operative to amplify electrical signals produced by fluctuations of said electrical current which accompany detonation of the burning cylinder gases and which are superimposed upon the periodically recurring surges of said electrical current, a coupling connection between the first mentioned output circuit and the output circuit of said second discharge device, and an indicator device coupled to said first mentioned output circuit and operative to indicate the occurrence of said fluctuations of said electrical current.

2. Detonation detecting apparatus as specified in claim 1, wherein said first discharge device includes an anode, a cathode, and a control grid, said control grid and said cathode being connected in the input circuit of said first discharge device and said anode and said cathode being connected in the output circuit of said first discharge device, and wherein said second discharge device includes an anode, a cathode, a control grid, and a second grid, the last mentioned control grid and cathode being connected in the input circuit of said second discharge device, the last mentioned anode and cathode being connected in the output circuit of said second discharge device, and said second grid being connected in said control circuit.

3. Detonation detecting apparatus as specified in claim 1, wherein the output circuit of said second discharge device includes inductive and capacitive elements cooperatively adapted to tune the last mentioned output circuit to be relatively insensitive to signals of the frequency of the periodically recurrent surges of said electrical current but to pass freely to said indicator device signals of the frequency of said fluctuations of said electrical current.

4. Detonation detecting apparatus as specified in claim 1, wherein said indicator device comprises electrical energy-storing means, a control device connected between said first mentioned output circuit and said energy-storing means and operative to deliver to the latter an electrical charge upon each recurrence of a group of said fluctuations of said electrical current, whereby said energy-storing means has developed thereacross a varying potential, the magnitude of which is a function of the average periodicity of recurrence of said groups of fluctuations, and potential indicating means connected in circuit with said energy-storing means and operative to indicate the instantaneous magnitude of said varying potential.

5. Detonation detecting apparatus as specified in claim 1, wherein said indicator device comprises electrical energy-storing means, a relay connected between said first mentioned output circuit and said energy-storing means and operative to deliver to the latter an electrical charge upon each recurrence of a group of said fluctuations of said electrical current, the magnitudes of said charges being substantially equal and independent of the intensities of the fluctuations producing them, whereby said energy-storing means has developed thereacross a varying potential, the magnitude of which is solely a function of the average periodicity of recurrence of said groups of fluctuations, and potential indicating means connected in circuit with said energy-storing means and operative to indicate the instantaneous magnitude of said varying potential.

6. Detonation detecting apparatus as specified in claim 1, wherein said indicator device comprises electrical energy-storing means, a control device connected between said first mentioned output circuit and said energy-storing means and operative to deliver to the latter an electrical charge upon each recurrence of a group of said fluctuations of said electrical current, the magnitude of each of said charges being dependent on the average intensity of the fluctuations of said electrical current composing the particular group of fluctuations producing said charge, whereby said energy-storing means has developed thereacross a varying potential, the magnitude of which is a function of the average intensity of said fluctuations and of the average periodicity of recurrence of said groups of fluctuations, and potential indicating means connected in circuit with said energy-storing means and operative to indicate the instantaneous magnitude of said varying potential.

7. Detonation detecting apparatus as specified in claim 1, wherein there is included cancelling means comprising a third electron discharge device included in said amplifying means and having an input circuit coupled to the output circuit of said second discharge device and having an output circuit coupled to said first mentioned output circuit, and comprising a fourth electron discharge device included in said amplifying means and having an input circuit coupled to said control circuit of said second discharge device and having an output circuit common to that of said third discharge device and hence coupled to said first mentioned output circuit, whereby said fourth discharge device is operative to produce in said common output circuit signals representative of the gain controlling signals of said control circuit which are substantially 180 degrees out of phase with, and operative to cancel, other signals in said common output circuit produced by said third discharge device and also representative of said gain controlling signals.

8. Detonation detecting apparatus as specified in claim 1, wherein said control circuit of said second discharge device includes time delay means operative to delay the control of the gain of said second discharge device by the conductivity of said first discharge device.

9. Detonation detecting apparatus as specified in claim 1, wherein said first mentioned input circuit is remotely located with respect to said first discharge device, and wherein there is included a transmission circuit having suitable low impedance characteristics and operative to transmit without substantial attenuation signals produced by said fluctuations of said electrical current which accompany detonation, a first impedance-changing device coupling said first mentioned input circuit to one end of said transmission circuit, and a second impedance-changing device coupling the remaining end of said transmission circuit to the input circuit of said first discharge device.

10. Detonation detecting apparatus as specified in claim 1, wherein said first mentioned input circuit is remotely located with respect to said first discharge device, and wherein there is included a transmission circuit having suitable low impedance characteristics and operative to transmit without substantial attenuation signals produced by said fluctuations of said electrical current which accompany detonation, an impedance step-down transformer coupling said first mentioned input circuit to one end of said transmission circuit, and an impedance step-up transformer coupling the remaining end of said transmission circuit to the input circuit of said first discharge device.

11. Detonation detecting apparatus as specified in claim 1, wherein said first mentioned input circuit is remotely located with respect to said first discharge device, and wherein there is included a transmission circuit having suitable low impedance characteristics and operative to transmit without substantial attenuation signals produced by said fluctuations of said electrical current which accompany detonation, an electron discharge device having an anode, a cathode, and a control grid, a resistor, an input circuit including the last mentioned cathode and control grid and said resistor, and coupled to said first mentioned input circuit, an output circuit including the last mentioned anode and cathode and said resistor, a connection between one end of said transmission circuit and the terminals of said resistor, and an impedance step-up device coupling the remaining end of said transmission circuit to the input circuit of said first discharge device.

12. In apparatus for detecting detonation in a cylinder of an internal combustion engine comprising a pair of spaced, electrically insulated electrodes adapted to be located within the engine cylinder and adapted when so located to be bridged by the burning gases of combustion therein, means adapted to be connected to a source of energizing voltage, said means including means for passing a unidirectional electrical current between said pair of electrodes, and electronic amplifying means having an input circuit including said pair of electrodes and having an output circuit supplied with energizing voltage by the first mentioned means, said electronic amplifying means comprising a plurality of stages of amplification having electron discharge devices associated therewith and including suppressing means for preventing electrical signals produced in said electronic amplifying means by periodically recurring surges of said electrical current which occur upon the ignition of the cylinder gases and the consequent burning thereof from appearing in said output circuit, the improvement comprising a first electron discharge device having an anode, a cathode, and a control grid, an input circuit including said control grid and said cathode and coupled to the first mentioned input circuit, a pair of terminals adapted to be connected to a source of energizing voltage, a first load resistor, an output circuit including said anode, said cathode, and said first load resistor connected in series between said terminals, a second electron discharge device having an anode, a cathode, a control grid, and a second grid, an input circuit including the last mentioned control grid and cathode and coupled across said first load resistor, a control circuit comprising a timing condenser, a timing resistor, a connection between said second grid and the first mentioned anode including said timing resistor, and a connection between said second grid and the cathode of said second discharge device including said timing condenser, a second load resistor, a tuned, parallel resonant circuit tuned to substantially the frequency of electrical signals produced by fluctuations of said electrical current which accompany detonation of the burning cylinder gases and which are superimposed upon said periodically recurring surges of said electrical current, a by-pass condenser, an output circuit including said second load resistor, said tuned circuit and the anode and cathode of said second discharge device connected in series between said terminals in the order stated, a connection between the junction of said second load resistor and said tuned circuit and the last mentioned cathode including said by-pass condenser, a third electron discharge device having an anode, a cathode, and a control grid, an input circuit including the last mentioned control grid and cathode and coupled across said tuned circuit, an indicator device, and an output circuit including the anode and cathode of said third discharge device and said indicator device connected in series between said terminals.

13. In apparatus for detecting detonation in a cylinder of an internal combustion engine comprising a pair of spaced, electrically insulated electrodes adapted to be located within the engine cylinder and adapted when so located to be bridged by the burning gases of combustion therein, means adapted to be connected to a source of energizing voltage, said means including means for passing a unidirectional electrical current between said pair of electrodes, and electronic amplifying means having an input circuit including said pair of electrodes and having an output circuit supplied with energizing voltage by the first mentioned means, said electronic amplifying means comprising a plurality of stages of amplification having electron discharge devices associated therewith and including suppressing means for preventing electrical signals produced in said electronic amplifying means by periodically recurring surges of said electrical current which occur upon the ignition of the cylinder gases and the consequent burning thereof from appearing in said output circuit, the improvement comprising a first electron discharge device having an anode, a cathode, and a control grid, an input circuit including said control grid and said cathode and coupled to the first mentioned input circuit, a pair of terminals adapted to be connected to a source of energizing voltage, a first load resistor, an output circuit including said anode, said cathode, and said first load resistor connected in series between said terminals, a second electron discharge device having an anode, a cathode, a control grid, and a second grid, an input circuit including the last mentioned control grid and cathode and coupled across said first load resistor, a control circuit comprising a timing condenser, a timing resistor, a connection between said second grid and the first mentioned anode including said timing resistor, and a connection between said second grid and the cathode of said second discharge device including said timing condenser, a second load resistor, an output circuit including said second load resistor and the anode and cathode of said second discharge device connected in series between said terminals, a third electron discharge device having an anode, a cathode, and a control grid, an input circuit including the last mentioned cathode and control grid and coupled across said second load resistor, a third load resistor, a tuned, parallel resonant circuit tuned to substantially the frequency of electrical signals produced by fluctuations of said electrical current which accompany detonation of the burning cylinder gases and which are superimposed upon said periodically recurring surges of said electrical current, a by-pass condenser, an output circuit including said third load resistor, said tuned circuit, and the anode and cathode of said third discharge device connected in series between said terminals in the order stated, a connection between the junction of said third load resistor and said tuned circuit and the last mentioned cathode including said by-pass condenser, a fourth electron discharge device having an anode, a cathode, a control grid, and a second grid, an input circuit including the last mentioned second grid and cathode and including a conductive connection between said last mentioned second grid and the first mentioned second grid and a conductive connection between the last mentioned cathode and the cathode of said third discharge device, an output circuit including the anode and cathode of said fourth discharge device and including a conductive connection between the last mentioned anode and the anode of said third discharge device, a connection between the control grid and the cathode of said fourth discharge device including a resistor, a fifth electron discharge device having an anode, a cathode, and a control grid, an input circuit including the last mentioned control grid and cathode and coupled across said tuned circuit, an indicator device, and an output circuit including the anode and cathode of said fifth discharge device and said indicator device connected in series between said terminals.

14. In apparatus for detecting the occurrence of fluctuations in a varying electrical current which are superimposed on the descending portions of periodically recurring surges of said electrical current comprising electronic amplifying means having an input circuit through which said electrical current is adapted to flow and having an output circuit, said electronic amplifying means comprising a plurality of stages of amplification having electron discharge devices associated therewith and including suppressing means for preventing electrical signals produced in said electronic amplifying means by the relatively slow increases in said electrical current which produce said periodically recurring surges thereof from appearing in said output circuit, the improvement comprising a first electron discharge device included in said amplifying means and having an output circuit and an input circuit coupled to the first mentioned input circuit, whereby the conductivity of said first discharge device is varied in accordance with changes in the magnitude of said electrical current, a second electron discharge device having an output circuit and an input circuit coupled to the output circuit of said first discharge device, whereby signals representative of the changes in said electrical current are applied to said second discharge device for amplification thereby, said second discharge device also including a control circuit coupled to the output circuit of said first discharge device and operative to control the gain of said second discharge device in accordance with the conductivity of said first discharge device, whereby said second discharge device is rendered substantially insensitive to signals produced by the increasing portions of the periodically recurring surges of said electrical current, but is rendered operative to amplify electrical signals produced by said fluctuations of said electrical current which are superimposed upon the periodically recurring surges of said electrical current, a coupling connection between the first mentioned output circuit and the output circuit of said second discharge device, and an indicator device coupled to said first mentioned output circuit and operative to indicate the occurrence of said fluctuations of said electrical current.

15. In apparatus for detecting detonation in a cylinder of an internal combustion engine comprising a pair of spaced, electrically insulated electrodes adapted to be located within the engine cylinder and adapted when so located to be bridged by the burning gases of combustion therein, means adapted to be connected to a source of energizing voltage, said means including means for passing a unidirectional electrical current between said pair of electrodes, and electronic amplifying means having an input circuit including said pair of electrodes and having an output circuit supplied with energizing voltage by the first mentioned means, said electronic amplifying means comprising a plurality of stages of amplification having electron discharge devices associated therewith and including suppressing means for preventing electrical signals produced in said electronic amplifying means by periodically recurring surges of said electrical current which occur upon the ignition of the cylinder gases and the consequent burning thereof from appearing in said output circuit, the improvement comprising a first electron discharge device included in said amplifying means and having an output circuit and an input circuit coupled to the first mentioned input circuit, whereby the conductivity of said first discharge device is varied in accordance with changes in the magnitude of said electrical current, a second electron discharge device having an output circuit and an input circuit coupled to the output circuit of said first discharge device, whereby signals representative of the changes in said electrical current are applied to said second discharge device for amplification thereby, the input circuit of said second discharge device including biasing means operative to bias said second discharge device to cut-off in the presence of signals produced by the increasing portions of the periodically recurring surges of said electrical current, but to permit said second discharge device to be conductive to, and to amplify, electrical signals produced by fluctuations of said electrical current which accompany detonation of the burning cylinder gases and which are superimposed upon said periodically recurring surges of said electrical current, a coupling connection between the first mentioned output circuit and the output circuit of said second discharge device, and an indicator device coupled to said first mentioned output circuit and operative to indicate the occurrence of said fluctuations of said electrical current.

16. Detonation detecting apparatus as specified in claim 15, wherein said first discharge device includes an anode, a cathode, and a control grid, said control grid and said cathode being connected in the input circuit of said first discharge device and said anode and said cathode being connected in the output circuit of said first discharge device, a pair of terminals adapted to be connected to a source of negative energizing voltage, said second discharge device including an anode, a cathode, and a control grid, the last mentioned control grid and cathode being connected in the input circuit of said second discharge device, a connection between the last mentioned control grid and the negative one of said pair of terminals, and a connection between the last mentioned cathode and the positive one of said pair of terminals, the output circuit of said second discharge device including the anode and the cathode thereof.

17. Detonation detecting apparatus as specified in claim 15, wherein the output circuit of said second discharge device includes inductive and capacitive elements cooperatively adapted to tune the last mentioned output circuit to be relatively insensitive to signals of the frequency of the periodically recurring surges of said electrical current but to pass freely to said indicator device signals of the frequency of said fluctuations of said electrical current.

18. Detonation detecting apparatus as specified in claim 15, wherein said indicator device comprises electrical energy-storing means, a control device connected between said first mentioned output circuit and said energy-storing means and operative to deliver to the latter an electrical charge upon each recurrence of a group of said fluctuations of said electrical current, whereby said energy-storing means has developed thereacross a varying potential, the magnitude of which is a function of the average periodicity of recurrence of said groups of fluctuations, and potential indicating means connected in circuit with said energy-storing means and operative to indicate the instantaneous magnitude of said varying potential.

19. Detonation detecting apparatus as specified in claim 15, wherein said indicator device comprises electrical energy-storing means, a relay connected between said first mentioned output circuit and said energy-storing means and operative to deliver to the latter an electrical charge upon each recurrence of a group of said fluctuations of said electrical current, the magnitudes of said charges being substantially equal and independent of the intensities of the fluctuations producing them, whereby said energy-storing means has developed thereacross a varying potential, the magnitude of which is solely a function of the average periodicity of recurrence of said groups of fluctuations, and potential indicating means connected in circuit with said energy-storing means and operative to indicate the instantaneous magnitude of said varying potential.

20. Detonation detecting apparatus as specified in claim 15, wherein said indicator device comprises electrical energy-storing means, a control device connected between said first mentioned output circuit and said energy-storing means and operative to deliver to the latter an electrical charge upon each recurrence of a group of said fluctuations of said electrical current, the magnitude of each of said charges being dependent on the average intensity of the fluctuations of said electrical current composing the particular group of fluctuations producing said charge, whereby said energy-storing means has developed thereacross a varying potential, the magnitude of which is a function of the average intensity of said fluctuations and of the average periodicity of recurrence of said groups of fluctuations, and potential indicating means connected in circuit with said energy-storing means and operative to indicate the instantaneous magnitude of said varying potential.

21. Detonation detecting apparatus as specified in claim 15, wherein there is included cancelling means comprising a third electron discharge device included in said amplifying means and having an input circuit coupled to the output circuit of said first discharge device, and having an output circuit coupled to the input circuit of said second discharge device, a fourth electron discharge device included in said amplifying means and having an input circuit coupled to the input circuit of said first discharge device and having an output circuit common to that of said third discharge device and hence coupled to the input circuit of said second discharge device, said fourth discharge device being operative to produce in said common output circuit signals representative of changes in the magnitude of said electrical current which are substantially 180 degrees out of phase with, and operative to cancel, other similar signals in said common output circuit produced by said third discharge device and also representative of said changes in the magnitude of said electrical current, and a by-pass device connected between the control grid and cathode of said fourth discharge device and operative to by-pass from the input circuit of said fourth discharge device signals produced by said fluctuations of said electrical current, whereby said fourth discharge device is inoperative to produce in said common output circuit signals representative of said fluctuations.

22. Detonation detecting apparatus as specified in claim 15, wherein the first mentioned means includes a pair of terminals adapted to be connected to a source of negative energizing voltage, wherein said first discharge device includes a cathode and a control grid connected in the input circuit of said first discharge device, and wherein said first mentioned input circuit includes a connection between one of said electrodes, said control grid, and the negative one of said pair of terminals, and a connection between the other of said electrodes, said cathode, and the positive one of said pair of terminals.

23. Detonation detecting apparatus as specified in claim 15, wherein said first mentioned input circuit is remotely located with respect to said first discharge device, and wherein there is included a transmission circuit having suitable low impedance characteristics and operative to transmit without substantial attenuation signals produced by said fluctuations of said electrical current which accompany detonation, a first impedance-changing device coupling said first mentioned input circuit to one end of said transmission circuit, and a second impedance-changing device coupling the remaining end of said transmission circuit to the input circuit of said first discharge device.

24. Detonation detecting apparatus as specified in claim 15, wherein said first mentioned input circuit is remotely located with respect to said first discharge device, and wherein there is included a transmission circuit having suitable low impedance characteristics and operative to transmit without substantial attenuation signals produced by said fluctuations of said electrical current which accompany detonation, an impedance step-down transformer coupling said first mentioned input circuit to one end of said transmission circuit, and an impedance step-up transformer coupling the remaining end of said transmission circuit to the input circuit of said first discharge device.

25. Detonation detecting apparatus as specified in claim 15, wherein said first mentioned input circuit is remotely located with respect to said first discharge device, and wherein there is included a transmission circuit having suitable low impedance characteristics and operative to transmit without substantial attenuation signals produced by said fluctuations of said electrical current which accompany detonation, an electron discharge device having an anode, a cathode, and a control grid, a resistor, an input circuit including the last mentioned cathode and control grid and said resistor, and coupled to said first mentioned input circuit, an output circuit including the last mentioned anode and cathode and said resistor, a connection between one end of said transmission circuit and the terminals of said resistor, and an impedance step-up device coupling the remaining end of said transmission circuit to the input circuit of said first discharge device.

26. In apparatus for detecting detonation in a cylinder of an internal combustion engine comprising a pair of spaced, electrically insulated electrodes adapted to be located within the engine cylinder and adapted when so located to be bridged by the burning gases of combustion therein, means adapted to be connected to a source of energizing voltage, said means including means for passing a unidirectional electrical current between said pair of electrodes, and electronic amplifying means having an input circuit including said pair of electrodes and having an output circuit supplied with energizing voltage by the first mentioned means, said electronic amplifying means comprising a plurality of stages of amplification having electron discharge devices associated therewith and including suppressing means for preventing electrical signals produced in said electronic amplifying means by periodically recurring surges of said electrical current which occur upon the ignition of the cylinder gases and the consequent burning thereof from appearing in said output circuit, the improvement comprising a first electron discharge device having an anode, a cathode, and a control grid, a first pair of terminals included in the first mentioned means and adapted to be connected to a source of negative energizing voltage, an input circuit including said control grid and said cathode and coupled to the first mentioned input circuit, the latter including a connection between one of said electrodes and said control grid, a connection including a resistor connected between said one of said electrodes and the negative one of said first pair of terminals, and a connection between the other of said electrodes, said cathode, and the positive one of said first pair of terminals, a second pair of terminals adapted to be connected to a source of energizing voltage, a first load resistor, an output circuit including said anode, said cathode, and said first load resistor connected in series between said second pair of terminals, a second electron discharge device having an anode, a cathode, and a control grid, an input circuit including the last mentioned control grid and cathode and coupled across said first load resistor, the last mentioned input circuit having a connection including a resistor connected between the control grid of said second discharge device and said negative one of said first pair of terminals, and having a connection between the cathode of said second discharge device and said positive one of said first pair of terminals, a second load resistor, a tuned, parallel resonant circuit tuned to substantially the frequency of electrical signals produced by fluctuations of said electrical current which accompany detonation of the burning cylinder gases and which are superimposed upon said periodically recurring surges of said electrical current, a by-pass condenser, an output circuit including said second load resistor, said tuned circuit, and the anode and cathode of said second discharge device connected in series between said second pair of terminals in the order stated, a connection between the junction of said second load resistor and said tuned circuit and the last mentioned cathode including said by-pass condenser, a third electron discharge device having an anode, a cathode, and a control grid, an input circuit including the last mentioned control grid and cathode and coupled across said tuned circuit, an indicator device, and an output circuit including the anode and cathode of said third discharge device and said indicator device connected in series between said second pair of terminals.

27. In apparatus for detecting detonation in a cylinder of an internal combustion engine comprising a pair of spaced, electrically insulated electrodes adapted to be located within the engine cylinder and adapted when so located to be bridged by the burning gases of combustion therein, means adapted to be connected to a source of energizing voltage, said means including means for passing a unidirectional electrical current between said pair of electrodes, and electronic amplifying means having an input circuit including said pair of electrodes and having an output circuit supplied with energizing voltage by the first mentioned means, said electronic amplifying means comprising a plurality of stages of amplification having electron discharge devices associated therewith and including suppressing means for preventing electrical signals produced in said electronic amplifying means by periodically recurring surges of said electrical current which occur upon the ignition of the cylinder gases and the consequent burning thereof from appearing in said output circuit, the improvement comprising a first electron discharge device having an anode, a cathode, and a control grid, a first pair of terminals included in the first mentioned means and adapted to be connected to a source of energizing voltage, an input circuit including said control grid and said cathode and coupled to the first mentioned input circuit, the latter including a connection between one of said electrodes and said control grid, a connection including a resistor connected between said one of said electrodes and the positive one of said first pair of terminals, a connection between the other of said electrodes and the negative one of said first pair of terminals, and a connection including a cathode resistor connected between said cathode and said negative one of said first pair of terminals, a first load resistor, an output circuit including said first load resistor, said anode, said cathode, and said cathode resistor connected in series between said first pair of terminals in the order stated, a second electron discharge device having an anode, a cathode, and a control grid, an input circuit including the last mentioned control grid and cathode and coupled across said first load resistor, a second load resistor, an output circuit including the anode and cathode of said second discharge device and said second load resistor connected in series between said first pair of terminals, a third electron discharge device having an anode, a cathode, and a control grid, a conductive connection between the cathodes of said second and third discharge devices, a bias resistor, a first by-pass condenser, an input circuit including the control grid and cathode of said third discharge device and having a connection including a resistor connected in series between the last mentioned control grid and the end of said cathode resistor which is connected to the cathode of said first discharge device, said bias resistor and said first by-pass condenser being connected in parallel between the last mentioned control grid and the connected cathodes of said second and third discharge devices, the value of said first by-pass condenser being chosen so as to by-pass from the input circuit of said third discharge device electrical signals produced by fluctuations of said electrical current which accompany detonation of the burning cylinder gases and which are superimposed upon said periodically recurring surges of said electrical current, an output circuit including the anode and cathode of said third discharge device and including a conductive connection between the last mentioned anode and the anode of said second discharge device, a fourth electron discharge device having an anode, a cathode, and a control grid, an input circuit including the last mentioned control grid and cathode and coupled across said second load resistor, a second pair of terminals adapted to be connected to a source of negative energizing voltage, the last mentioned input circuit having a connection including a resistor connected between the control grid of said fourth discharge device and the negative one of said second pair of terminals, a connection between the cathode of said fourth discharge device and the positive one of said second pair of terminals, a third load resistor, a tuned, parallel resonant circuit tuned to substantially the frequency of said electrical signals produced by fluctuations of said electrical current which accompany detonation, a second by-pass condenser, an output circuit including said third load resistor, said tuned circuit, and the anode and cathode of said fourth discharge device connected in series between said first pair of terminals in the order stated, a connection between the junction of said third load resistor and said tuned circuit and the last mentioned cathode including said second by-pass condenser, a fifth electron discharge device having an anode, a cathode, and a control grid, an input circuit including the last mentioned control grid and cathode and coupled across said tuned circuit, an indicator device, and an output circuit including the anode and cathode of said fifth discharge device and said indicator device connected in series between said first pair of terminals.

28. In apparatus for detecting the occurrence of fluctuations in a varying electrical current which are superimposed on the descending portions of periodically recurring surges of said electrical current comprising electronic amplifying means having an input circuit through which said electrical current is adapted to flow and having an output circuit, said electronic amplifying means comprising a plurality of stages of amplification having electron discharge devices associated therewith and including suppressing means for preventing electrical signals produced in said electronic amplifying means by the relatively slow increases in said electrical current which produce said periodically recurring surges thereof from appearing in said output circuit, the improvement comprising a first electron discharge device included in said amplifying means and having an output circuit and an input circuit coupled to the first mentioned input circuit, whereby the conductivity of said first discharge device is varied in accordance with changes in the magnitude of said electrical current, a second electron discharge device having an output circuit and an input circuit coupled to the output circuit of said first discharge device, whereby signals representative of the changes in said electrical current are applied to said second discharge device for amplification thereby, the input circuit of said second discharge device including biasing means operative to bias said second discharge device to cut-off in the presence of signals produced by the increasing portions of the periodically recurring surges of said electrical current, but to permit said second discharge device to be conductive to, and to amplify, electrical signals produced by said fluctuations of said electrical current which are superimposed upon said periodically recurring surges of said electrical current, a coupling connection between the first mentioned output circuit and the output circuit of second discharge device, and an indicator device coupled to said first mentioned output circuit and operative to indicate the occurrence of said fluctuations of said electrical current.

29. Apparatus for detecting the occurrence of fluctuations in a varying electrical current which are superimposed on the descending portions of periodically recurring surges of the electrical current, comprising electronic amplifying means having an input through which the electrical current flows and having an output circuit, said electronic amplifying means including suppressing means for suppressing the effects of the relatively slow increases in the electrical current which produce the periodically recurring surges of the electrical current and for detecting the occurrence of relatively rapid fluctuations of the electrical current which occur during relatively slow decreases in the electrical current following the relatively slow increases in the electrical current, said suppressing means including an electron discharge device having an anode, a cathode, and a grid electrode, means normally operative to apply a predetermined potential difference between said grid electrode and said cathode, whereby said discharge device is operative to suppress the effects of said relatively slow electrical current increases and substantially to prevent the appearance in said output circuit of signals corresponding to said electrical current increases, means operative to change said predetermined potential difference upon the occurrence of said fluctuations in said electrical current, whereby said amplifying means is operative to produce in said output circuit signals corresponding to said electrical current fluctuations, and an indicator device coupled to said output circuit, responsive to said signals corresponding to said electrical current fluctuations, and operative to indicate the occurrence of the last mentioned signals.

30. Apparatus as specified in claim 29, wherein said indicator device comprises electrical energy-storing means, a control device connected between said output circuit and said energy-storing means and operative in response to the occurrence in said output circuit of said signals corresponding to said electrical current fluctuations to deliver to the latter an electrical charge upon each recurrence of a group of said electrical current fluctuations, whereby said energy-storing means has developed thereacross a varying potential the magnitude of which is a function of the average periodicity of recurrence of said groups of fluctuations, and potential indicating means connected in circuit with said energy-storing means and operative to indicate the instantaneous magnitude of said varying potential.

JAMES C. MOUZON.

REFERENCES CITED

The following references are of record in the file of this patent:

UNITED STATES PATENTS

| Number | Name | Date |
|---|---|---|
| 1,395,335 | Chubb | Nov. 1, 1921 |
| 1,677,157 | Weaver | July 17, 1928 |
| 1,789,369 | Meissner | Jan. 20, 1931 |
| 1,814,898 | Deardorff | July 14, 1931 |
| 1,913,436 | Eckstein | June 13, 1933 |
| 2,094,472 | Rohats | Sept. 28, 1937 |